(12) United States Patent
Kumagai

(10) Patent No.: US 12,315,120 B2
(45) Date of Patent: May 27, 2025

(54) DISPLAY APPARATUS AND DISPLAY METHOD

(71) Applicant: SONY GROUP CORPORATION, Tokyo (JP)

(72) Inventor: Kota Kumagai, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 275 days.

(21) Appl. No.: 17/919,844

(22) PCT Filed: Mar. 12, 2021

(86) PCT No.: PCT/JP2021/010127
§ 371 (c)(1),
(2) Date: Oct. 19, 2022

(87) PCT Pub. No.: WO2021/220639
PCT Pub. Date: Nov. 4, 2021

(65) Prior Publication Data
US 2023/0289925 A1    Sep. 14, 2023

(30) Foreign Application Priority Data
Apr. 27, 2020    (JP) .................................. 2020-078223

(51) Int. Cl.
*G06T 5/73*    (2024.01)
*G02B 30/34*    (2020.01)
*G09G 3/36*    (2006.01)

(52) U.S. Cl.
CPC .............. *G06T 5/73* (2024.01); *G02B 30/34* (2020.01); *G09G 3/36* (2013.01); *G06T 2207/10012* (2013.01); *G09G 2320/0261* (2013.01)

(58) Field of Classification Search
CPC . G06T 5/73; G06T 2207/10012; G02B 30/34; G02B 30/24; G02B 27/02;
(Continued)

(56) References Cited

U.S. PATENT DOCUMENTS

2005/0271264 A1* 12/2005 Ito .............................. G06T 5/80
382/154
2013/0093843 A1* 4/2013 Chun ..................... H04N 13/00
348/42
(Continued)

FOREIGN PATENT DOCUMENTS

| JP | 09-247711 A | 9/1997 |
| JP | 2014-509472 A | 4/2014 |
| JP | 2018-151459 A | 9/2018 |

OTHER PUBLICATIONS

International Search Report and Written Opinion of PCT Application No. PCT/JP2021/010127, issued on Jun. 8, 2021, 09 pages of ISRWO.

*Primary Examiner* — Jitesh Patel
(74) *Attorney, Agent, or Firm* — CHIP LAW GROUP

(57) ABSTRACT

Provided is a display apparatus that displays, in at least one display plane, a stereo image based on an original image to cause a three-dimensional image to be viewed, the display apparatus including a correction system that corrects the original image such that a blur caused when the three-dimensional image is caused to be viewed at at least one position is suppressed, and a display system that displays, in the at least one display plane, a stereo image based on the original image after the correction.

22 Claims, 16 Drawing Sheets

(58) Field of Classification Search
CPC ............. G09G 3/36; G09G 2320/0261; H04N 13/122; H04N 13/344; H04N 13/395
See application file for complete search history.

(56) References Cited

U.S. PATENT DOCUMENTS

| | | | |
|---|---|---|---|
| 2014/0205185 A1* | 7/2014 | Tokui | H04N 13/239 382/154 |
| 2014/0340486 A1* | 11/2014 | Asano | H04N 13/144 348/47 |
| 2016/0011425 A1* | 1/2016 | Thurber | G09G 5/00 345/8 |
| 2016/0012603 A1* | 1/2016 | Unten | G06T 7/593 382/154 |
| 2017/0085867 A1* | 3/2017 | Baran | B41M 3/06 |
| 2017/0094278 A1* | 3/2017 | Bickerstaff | H04N 19/136 |
| 2019/0180514 A1* | 6/2019 | Sasaki | H04N 13/128 |

* cited by examiner

DISPLAY APPARATUS AND DISPLAY METHOD

CROSS REFERENCE TO RELATED APPLICATIONS

This application is a U.S. National Phase of International Patent Application No. PCT/JP2021/010127 filed on Mar. 12, 2021, which claims priority benefit of Japanese Patent Application No. JP 2020-078223 filed in the Japan Patent Office on Apr. 27, 2020. Each of the above-referenced applications is hereby incorporated herein by reference in its entirety.

TECHNICAL FIELD

The technology according to the present disclosure (hereinafter also referred to as the "present technology") relates to a display apparatus and a display method.

BACKGROUND ART

Conventionally, a technology is known that displays, in at least one display plane, a stereo image based on an original image and causes a three-dimensional image to be viewed (for example, refer to Patent Literature 1).

CITATION LIST

Patent Literature

Patent Literature 1: Japanese Patent Application Laid-open No. 2018-151459

DISCLOSURE OF INVENTION

Technical Problem

However, the existing technology results in there being room for improvement in reducing vergence-accommodation conflict while preventing an apparatus from being made larger in size.

Thus, it is a primary object of the present technology to provide a display apparatus and a display method that make it possible to reduce vergence-accommodation conflict while preventing the apparatus from being made larger in size.

Solution to Problem

The present technology provides a display apparatus that displays, in at least one display plane, a stereo image based on an original image to cause a three-dimensional image to be viewed, the display apparatus including:
  a correction system that corrects the original image such that a blur caused when the three-dimensional image is caused to be viewed at at least one position is suppressed; and a display system that displays, in the at least one display plane, a stereo image based on the original image after the correction.

The at least one position may include a position different from the display plane.

The original image after the correction may be more precise than the original image before the correction.

The correction system may correct the original image such that blurs caused when the three-dimensional images are caused to be respectively viewed at the positions of a plurality of the positions are suppressed, and may generate a plurality of corrected images respectively corresponding to the positions of the plurality of the positions; and the display system may chronologically display, in the display plane, stereo images based respectively on corrected images of the plurality of corrected images.

The correction system may generate the plurality of corrected images such that a corrected image, from among the plurality of corrected images, that corresponds to the position situated farther away from the display plane, is more precise.

The correction system may generate the plurality of corrected images such that the three-dimensional images respectively viewed at the positions of the plurality of the positions exhibit the same level of preciseness.

The correction system may generate at least two corrected images, from among the plurality of corrected images, that respectively correspond to specified positions from among the plurality of the positions, and the display system may consecutively display, in the display plane, the stereo images based respectively on the at least two corrected images respectively corresponding to the specified positions.

The correction system may include a section for acquiring/holding blur information that acquires and/or holds blur information that is information regarding the blur caused at the at least one position, and an image correction section that corrects the original image on the basis of the blur information.

The at least one display plane may be a plurality of display planes including first and second display planes that are arranged in a direction of being situated close to and away from two eyes of a viewer who views the three-dimensional image; the section for acquiring/holding blur information may acquire first blur information that is the blur information regarding a blur caused at a certain position when the first display plane is used as a reference, the certain position being relatively close to the first display plane in the direction of being situated close to and away from the two eyes; the section for acquiring/holding blur information may acquire second blur information that is the blur information regarding a blur caused at another position when the second display plane is used as a reference, the other position being relatively close to the second display plane in the direction of being situated close to and away from the two eyes; the image correction section corrects the original image on the basis of the first blur information to generate a first corrected image; the image correction section may correct the original image on the basis of the second blur information to generate a second corrected image; the display system may display, in the first display plane, a stereo image based on the first corrected image; and the display system may display, in the second display plane, a stereo image based on the second corrected image.

The display system may include a first image-light generator that generates a plurality of pieces of left-eye image light including first and second pieces of left-eye image light and being used to display left-eye images of the stereo images in respective display planes of the plurality of display planes including the first and second display planes; a second image-light generator that generates a plurality of pieces of right-eye image light including first and second pieces of right-eye image light and being used to display right-eye images of the stereo images in the respective display planes of the plurality of display planes including the first and second display planes; a first optical system that guides, to the left eye of the viewer, the plurality of pieces of left-eye image light coming from the first image-light generator; and a second optical system that guides, to the right eye of the viewer, the plurality of pieces of right-eye image light coming from the second image-light generator.

The first image-light generator may include a plurality of first display elements respectively generating pieces of left-eye image light of the plurality of pieces of left-eye image light, the second image-light generator may include a plurality of second display elements respectively generating pieces of right-eye image light of the plurality of pieces of right-eye image light, the first optical system may include a first beam splitter that guides, to the left eye of the viewer, portions of the respective pieces of left-eye image light of the plurality of pieces of left-eye image light coming from the plurality of first display elements, and the second optical system may include a second beam splitter that guides, to the right eye of the viewer, portions of the respective pieces of right-eye image light of the plurality of pieces of right-eye image light coming from the plurality of second display elements.

The first image-light generator may include a first light source, and a plurality of first liquid crystal display elements arranged between the first light source and the left eye of the viewer, and the second image-light generator may include a second light source, and a plurality of second liquid crystal display elements arranged between the second light source and the right eye of the viewer.

The first image-light generator may include a first display element, the first optical system may include a first focal-length changeable lens that is arranged between the first display element and the left eye of the viewer, the second image-light generator may include a second display element, and the second optical system may include a second focal-length changeable lens that is arranged between the second display element and the right eye of the viewer.

The first image-light generator may include a first display element, and a first drive section that drives the first display element in the direction of being situated close to and away from the two eyes, and the second image-light generator may include a second display element, and a second drive section that drives the second display element in the direction of being situated close to and away from the two eyes.

At least the display system from among the correction system and the display system may be used by being worn on a head of the viewer.

The present technology also provides a display method that displays, in at least one display plane, a stereo image based on an original image to cause a three-dimensional image to be viewed, the display method including:

correcting the original image such that a blur caused when the three-dimensional image is caused to be viewed at at least one position is suppressed; and displaying, in the at least one display plane, the stereo image based on the original image after the correction.

The display method according to claim 16, in which the at least one position includes a position different from the display plane.

The correcting may include performing correction such that the original image after the correction is more precise than the original image before the correction.

The correcting may include correcting the original image such that blurs caused when the three-dimensional images are caused to be respectively viewed at the positions of a plurality of the positions are suppressed, and generating a plurality of corrected images respectively corresponding to the positions of the plurality of the positions; and the displaying may include chronologically displaying, in the display plane, stereo images based respectively on corrected images of the plurality of corrected images.

The correcting may include generating the plurality of corrected images such that a corrected image, from among the plurality of corrected images, that corresponds to the position situated farther away from the display plane, is more precise.

The correcting may include generating the plurality of corrected images such that the three-dimensional images respectively viewed at the positions of the plurality of the positions exhibit the same level of preciseness.

The correcting may include generating at least two corrected images, from among the plurality of corrected images, that respectively correspond to specified positions from among the plurality of the positions, and the displaying may include consecutively displaying, in the display plane, the stereo images based respectively on the at least two corrected images respectively corresponding to the specified positions.

The correcting may include acquiring and/or holding blur information that is information regarding the blur caused at the at least one position, and correcting the original image on the basis of the blur information.

The at least one display plane may be a plurality of display planes including first and second display planes that are arranged in a direction of being situated close to and away from two eyes of a viewer who views the three-dimensional image; the acquiring and/or holding the blur information may include acquiring first blur information that is the blur information regarding a blur caused at a certain position when the first display plane is used as a reference, the certain position being relatively close to the first display plane in the direction of being situated close to and away from the two eyes, and acquiring second blur information that is the blur information regarding a blur caused at another position when the second display plane is used as a reference, the other position being relatively close to the second display plane in the direction of being situated close to and away from the two eyes; the correcting the original image on the basis of the blur information may include correcting the original image on the basis of the first blur information to generate a first corrected image, and correcting the original image on the basis of the second blur information to generate a second corrected image; and the displaying may include displaying, in the first display plane, a stereo image based on the first corrected image, and displaying, in the second display plane, a stereo image based on the second corrected image.

MODE(S) FOR CARRYING OUT THE INVENTION

Figure 1:
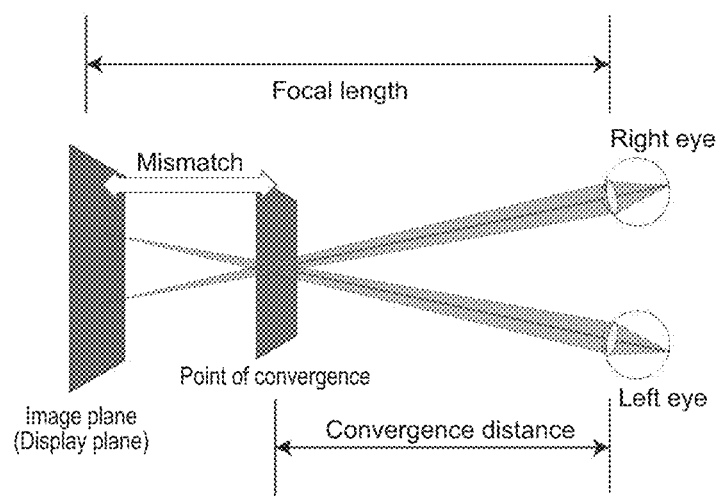
FIG. 1 is a diagram used to describe vergence-accommodation conflict.

Favorable embodiments of the present technology will now be described below in detail with reference to the accompanying drawings. Note that, in the specification and the drawings, components having substantially the same functional configuration are denoted by the same reference numeral to omit a repetitive description. The embodiments described below are examples of representative embodiments of the present technology, and the scope of the present technology is not construed as being limited to the embodiments. Even when an example in which a display apparatus and a display method according to the present technology each provide a plurality of effects is described herein, it is sufficient if the display apparatus and the display method according to the present technology each provide at least one of the plurality of effects. Effects described herein are not limitative but are merely illustrative, and other effects may be provided.

Note that the description is made in the following order.
1. Introduction
2. Ideas Leading to Present Technology
3. Basic Sequence of Present Technology
4. Application Sequence of Present Technology
5. Configuration of Display Apparatus According to Embodiment of Present Technology
6. Display Processing 1
7. Effects Provided by Display Apparatus and Display Method According to Embodiment of Present Technology
8. Display Processing 2
9. Display Processing 3
10. Modifications of Present Technology 1. <Introduction>

Conventionally, a 3D display apparatus (a display apparatus) is known that displays, in a display plane, a stereo image based on an original image and causes a three-dimensional image (a 3D image) to be viewed.

The existing 3D display apparatus causes vergence-accommodation conflict (VAC) due to a fundamental issue caused upon displaying a stereo image (using disparity between the two eyes).

As illustrated in FIG. 1, the VAC is a phenomenon in which a convergence distance (a distance from a point corresponding to the eyeballs to a point at which lines of sight of the two eyes intersect) corresponds to a three-dimensional image viewed due to the disparity between the two eyes, whereas a focal length is fixed to a length up to a display plane (an image plane). This results in physiological unpleasant feelings such as an eyestrain and a 3D sickness, and in restrictions on the user's age.

Figure 2:
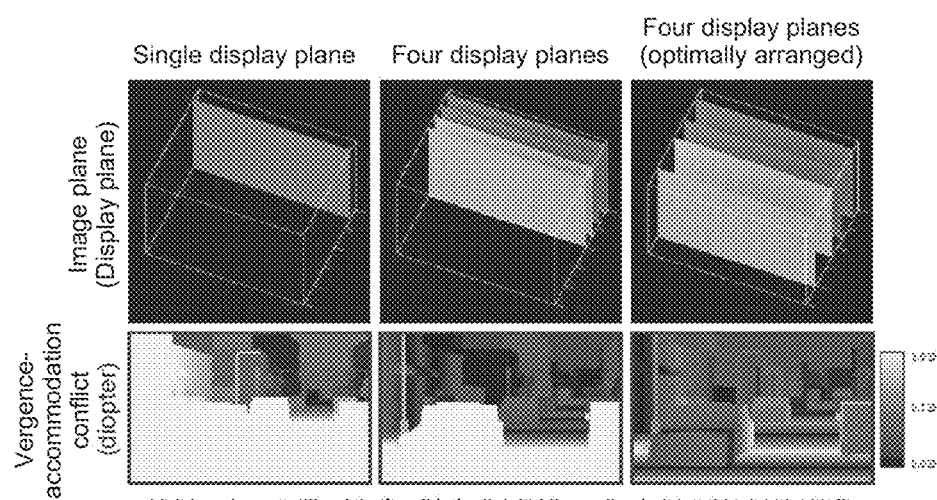
FIG. 2 is a diagram used to describe a relationship between the number of display planes, the arrangement of a display plane, and a reduction in vergence-accommodation conflict.

Thus, an approach of reducing VAC by providing a plurality of display planes, as illustrated in FIG. 2, has been proposed.

FIG. 2 illustrates, in an upper portion, examples of a layout of a display plane. FIG. 2 illustrates, in a lower portion, VAC in each of the examples of a layout of a display plane.

For example, it is understood that, when a single display plane is arranged in back, as illustrated on the left in the upper portion of FIG. 2, the VAC is reduced only in a narrow range in back, as illustrated on the left in the lower portion of FIG. 2.

For example, it is understood that, when a plurality of (for example, four) display planes is arranged, for example, in back, as illustrated in a middle portion of the upper portion of FIG. 2, the VAC is reduced in a wide range in back, as illustrated in a middle portion of the lower portion of FIG. 2.

For example, it is understood that, when a plurality of (for example, four) display planes is substantially equally spaced in, for example, a portion from the front to the back, as illustrated on the right in the upper portion of FIG. 2, the VAC is reduced in almost all of a range in a depth direction, as illustrated on the right in the lower portion of FIG. 2.

As described above, there is a trade-off relationship between a range, in a depth direction, in which VAC can be reduced, and the number of display planes. Thus, there is a need to provide a large number of display planes in order to reduce VAC only using the approach described above and to suppress eyestrain and a 3D sickness. Further, there is a need to closely arrange display planes in order to improve the effects of such suppression.

However, in this case, there is a need to provide an additional element and/or optical system used to generate a display plane. This results in making an apparatus larger in size.

Thus, the inventors have earnestly discussed, and, consequently, they have reached development of a display apparatus that makes it possible to reduce vergence-accommodation conflict while preventing the apparatus from being made larger in size.

2. <Ideas Leading to Present Technology>

Ideas leading to the present technology are described below.

First, a stereo image based on an original image is displayed in a display plane. Here, when the two eyes of a watcher focus on the stereo image displayed in the display plane, a three-dimensional image can be viewed at, for example, a position (such as a position situated ahead of or behind the display plane) that is different from the display plane due to a principle of disparity.

However, in this case, the two eyes of the watcher do not focus on the three-dimensional image, and this results in the occurrence of a blur. An amount of the blur (a blur amount) is larger at a position situated farther away from the display plane.

Here, the watcher tends to cause his/her two eyes to focus on a position at which a contour of an object can be seen more clearly (an object can be seen more precisely).

Thus, if it is possible to cause a watcher to view a more precise three-dimensional image, this will enable the watcher to cause his/her two eyes to easily focus on the three-dimensional image. This makes it possible to reduce vergence-accommodation conflict.

3. <Basic Sequence of Present Technology>

Figure 3:
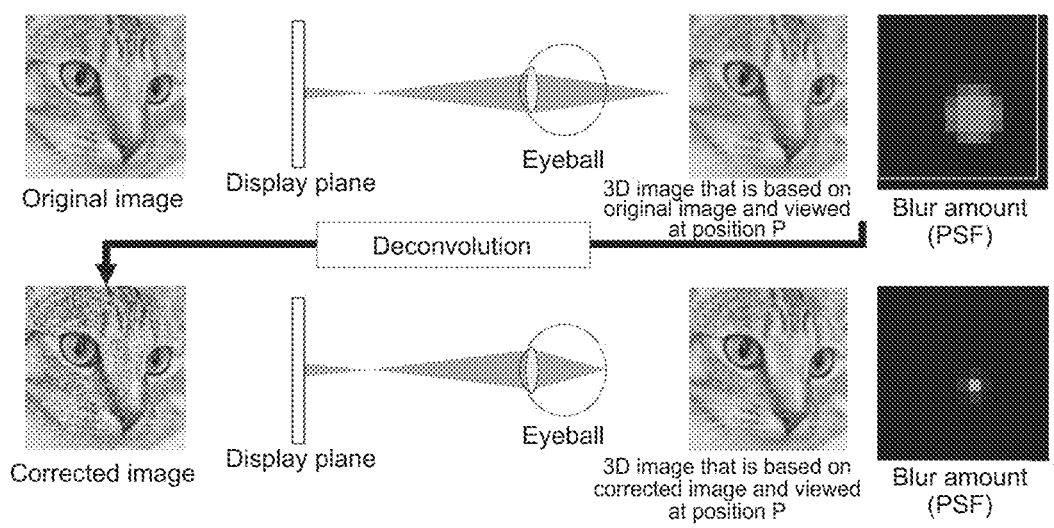
FIG. 3 is a diagram (a first diagram) used to describe a basic sequence of the present technology.
Figure 4:
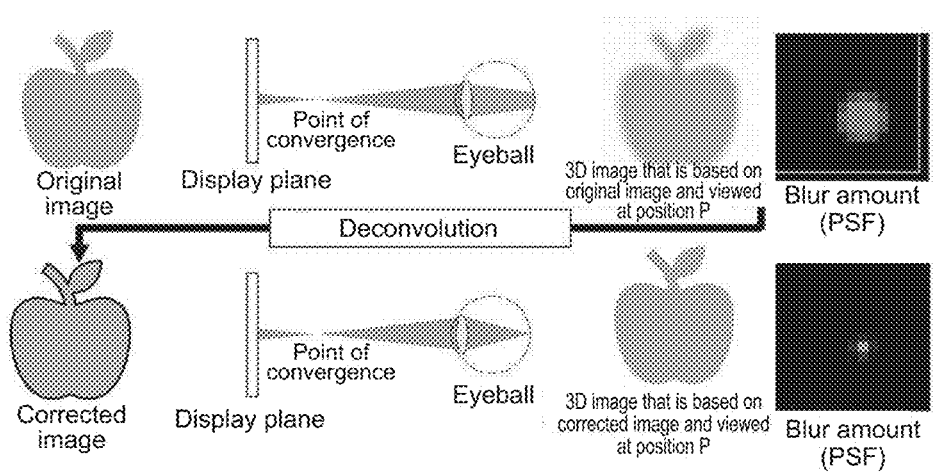
FIG. 4 is a diagram (a second diagram) used to describe the basic sequence of the present technology.
Figure 5:
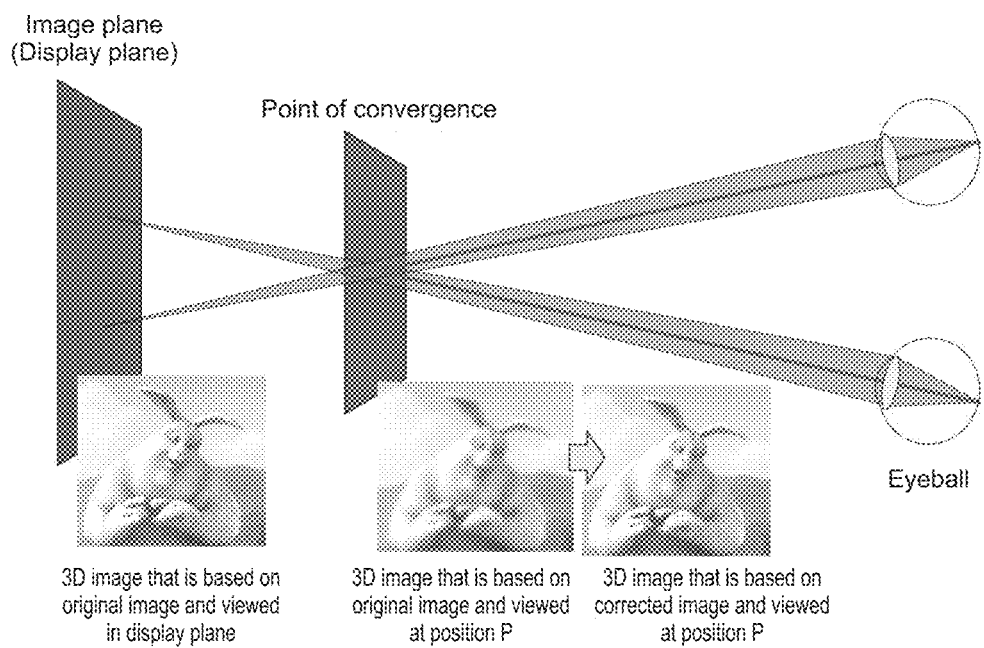
FIG. 5 is a diagram (a third diagram) used to describe the basic sequence of the present technology.

A basic sequence of the present technology is described with reference to FIGS. 3 to 5.

Here, a plurality of examples of different types of original images is described in order to facilitate understanding of the description. FIG. 3 illustrates an example in which a 3D image is caused to be viewed on the basis of a complicated original image. FIG. 4 illustrates an example in which a 3D image is caused to be viewed on the basis of a simple original image. FIG. 5 illustrates an example in which a 3D image is caused to be viewed on the basis of a rather complicated original image.

Procedure 1: A blur amount (a point spread function (PSF), and the same applies to the following description) of a 3D image viewed at at least one position P when a stereo image based on an original image is displayed in a display plane, is acquired in advance and/or when necessary (refer to FIGS. 3 and 4).

Procedure 2: The original image is corrected (deconvolved) on the basis of the acquired blur amount in the 3D image at the position P to generate the corrected image. Here, it is favorable that the correction be performed such that the original image is more precise if a blur amount is larger (refer to FIGS. 3 and 4).

Procedure 3: A stereo image based on the generated corrected image (the corrected image corresponding to the position P) is displayed in the display plane. Here, a watcher can cause his/her eyes to easily focus on the 3D image viewed at the position P, and thus the blur amount in the 3D image is reduced (refer to FIG. 5). This results in reducing vergence-accommodation conflict at the position P.

4. <Application Sequence of Present Technology>

An application sequence of the present technology is described with reference to FIG. 6.

Figure 6:
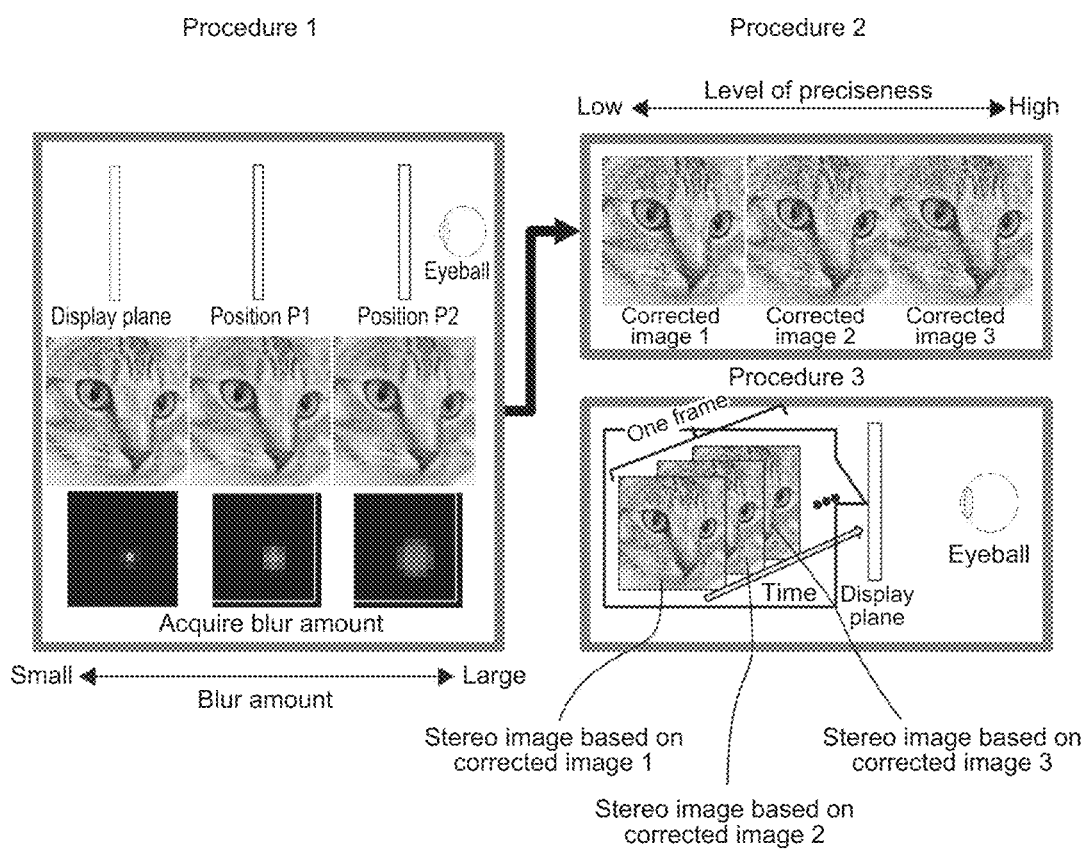
FIG. 6 is a diagram used to describe an application sequence of the present technology.

FIG. 6 illustrates an example in which a 3D image is caused to be viewed on the basis of a complicated original image.

Procedure 1: Blur amounts (PSFs) of 3D images respectively viewed at a plurality of positions P (for example, a display plane, a position P1, and a position P2) when stereo images based on an original image are displayed in the display plane, are acquired in advance and/or when necessary.

Procedure 2: The original image is corrected (deconvolved) on the basis of each of the acquired blur amounts at the respective positions P to generate the corrected image for each position P. Here, it is favorable that the correction be performed such that the original image is more precise if a blur amount is larger. Further, it is favorable that the correction be performed such that the corrected images corresponding to the respective positions P exhibit the same level of preciseness.

Procedure 3: Stereo images based respectively on the generated corrected images of a plurality of corrected images (for example, a corrected image 1 corresponding to the display plane, a corrected image 2 corresponding to the position P1, and a corrected image 3 corresponding to the position P2) are chronologically displayed in the display plane. For example, one frame is formed of three stereo images based respectively on the corrected images 1 to 3 to display the frame repeatedly. Here, a watcher can cause his/her eyes to easily focus on the 3D image viewed at each position P, and thus the blur amount in the 3D image is reduced. This results in reducing vergence-accommodation conflict at each position P.

Note that, actually, there is also a little blur caused in the display plane. Thus, an amount of a blur in the display plane is also acquired to generate a corrected image corresponding to the display plane. However, the corrected image corresponding to the display plane does not necessarily have to be generated. In other words, a 3D image based on an original image may be caused to be viewed by a watcher in a display plane.

5. <Configuration of Display Apparatus According to Embodiment of Present Technology>

A display apparatus 10 according to an embodiment of the present technology is described with reference to FIGS. 7 and 8.

Figure 7:
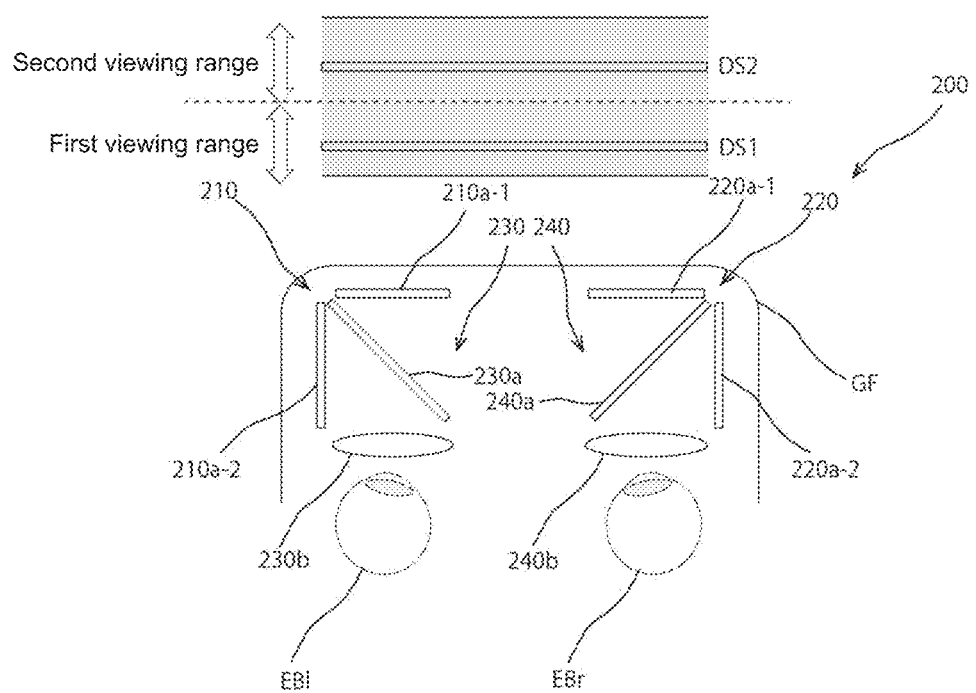
FIG. 7 illustrates a configuration of a display system of a display apparatus according to an embodiment of the present technology.

FIG. 7 illustrates a configuration of a display system of the display apparatus 10. FIG. 8 illustrates functions of the display apparatus 10.

The display apparatus 10 is a display apparatus that displays, in at least one display plane DS, a stereo image based on an original image to cause a three-dimensional image to be viewed. The display apparatus 10 can be applied to a display apparatus such as a head-mounted display (HMD), a head-up display (HUD), a projector, or an aerial display.

In an HMD in particular, the display apparatus 10 can be applied to both a virtual reality (VR) approach and an augmented reality (AR) approach.

Figure 8:
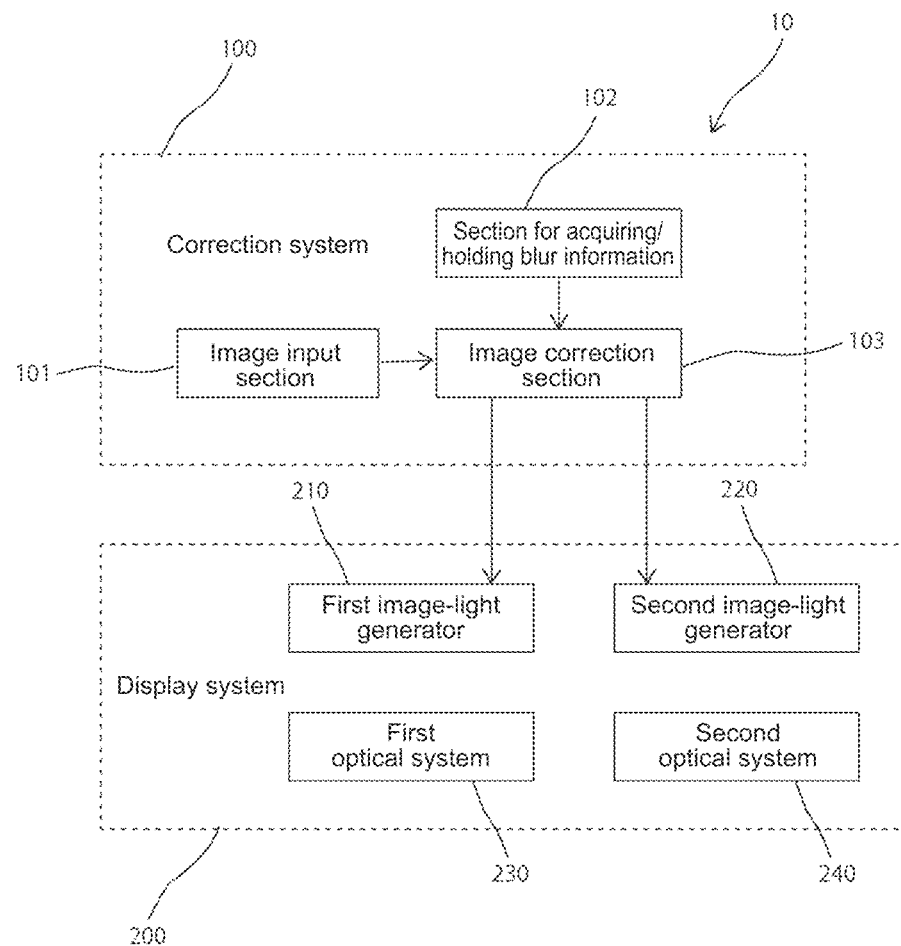
FIG. 8 is a block diagram illustrating functions of the display apparatus according to the embodiment of the present technology.
Figure 9:
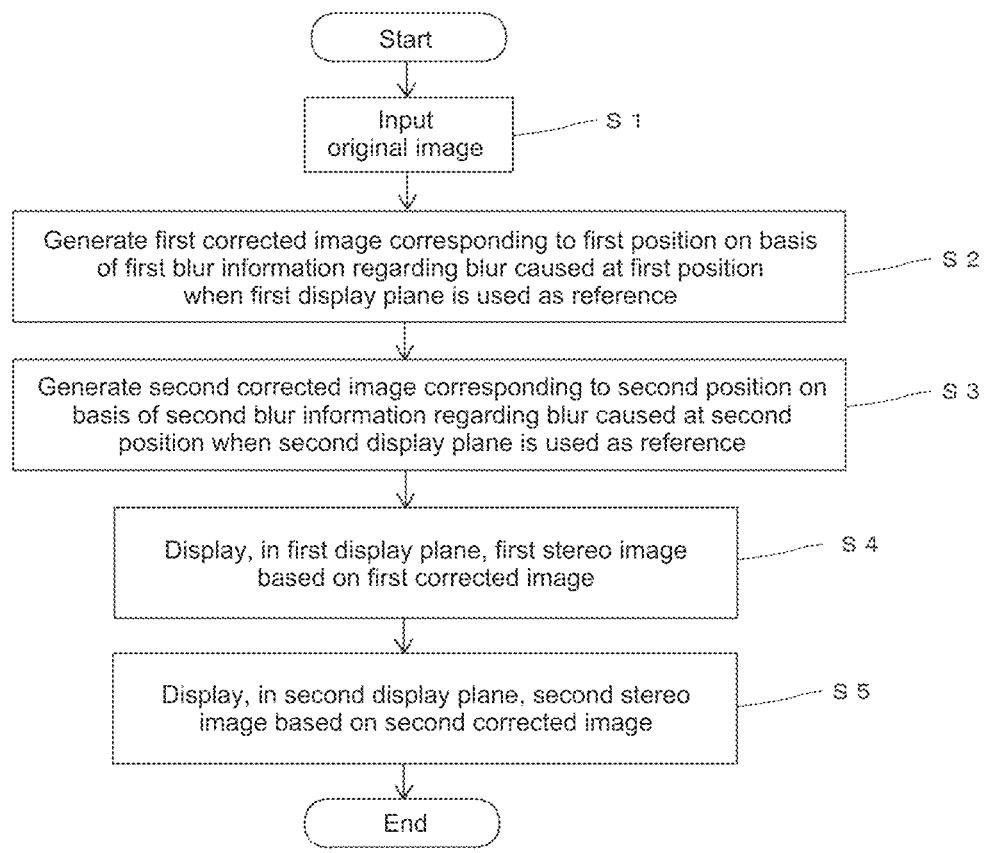
FIG. 9 is a flowchart used to describe Display Processing 1.

As illustrated in FIG. 8, the display apparatus 10 includes a correction system 100 and a display system 200.

[Correction System]

The correction system 100 corrects an original image such that a blur caused when a three-dimensional image is caused to be viewed at at least one position P is suppressed.

It is favorable that the at least one position P include a position different from the display plane DS.

It is favorable that an original image after correction be more precise than the original image before the correction.

The display plane DS may be a virtual-image plane in which a virtual image is displayed, or a real-image plane in which a real image is displayed.

The correction system 100 may correct an original image such that blurs caused when three-dimensional images are caused to be respectively viewed at positions P of a plurality of positions P are suppressed, and may generate a plurality of corrected images respectively corresponding to the positions P of the plurality of positions P. It is favorable that, in this case, the display system 200 chronologically display, in the display plane DS, stereo images based respectively on corrected images of the plurality of corrected images.

It is favorable that the correction system 100 generate the plurality of corrected images such that a corrected image, from among the plurality of corrected images, that corresponds to the position P situated farther away from the display plane DS, is more precise.

In this case, the correction system 100 may generate the plurality of corrected images such that three-dimensional images respectively viewed at the positions P of the plurality of positions P exhibit the same level of preciseness.

The correction system 100 includes an image input section 101, a section 102 for acquiring/holding blur information, and an image correction section 103. The correction system 100 is implemented by hardware including, for example a CPU and a memory.

(Image Input Section)

Data of an original image is input to the image input section 101 from an apparatus, such as a personal computer, a digital camera, a smartphone, or a game machine, that outputs an image, and the image input section 101 transmits the input data of the original image to the image correction section 103.

(Section for Acquiring/Holding Blur Information)

The section 102 for acquiring/holding blur information acquires and/or holds blur information (a blur amount: PSF) that is information regarding a blur caused at the at least one position P. The section 102 for acquiring/holding blur information transmits the acquired and/or held blur information to the image correction section 103.

The section 102 for acquiring/holding blur information may acquire and hold blur information in advance, or may acquire the blur information when necessary (in real time).

(Image Correction Section)

The image correction section 103 corrects the original image received from the image input section 101, using the blur information received from the section 102 for acquiring/holding blur information. Specifically, the image correction section 103 solves an inverse problem regarding an original image using blur information to generate a corrected image.

The image correction section 103 outputs the original image after the correction (the original image corrected by the correction system 100) to the display system 200.

[Display System]

As illustrated in FIG. 7, the display system 200 displays, in at least one display plane DS, a stereo image based on an original image after correction.

For example, the at least one display plane DS is a plurality of (for example, two) display planes DS including first and second display planes DS1 and DS2 that are arranged in a direction of being situated close to and away from two eyes (a left eye EB1 and a right eye EBr) of a viewer who views a three-dimensional image.

The display system 200 includes first and second image-light generators 210 and 220 and first and second optical systems 230 and 240.

For example, the first and second image-light generators 210 and 220 and the first and second optical systems 230 and 240 are provided integrally with a frame of glasses GF.

In the following description, the frame of glasses GF is assumed to be worn on the head of the viewer.

(First Image-Light Generator)

On the basis of an original image after correction that is received from the image correction section 103, the first image-light generator 210 generates a plurality of (for example, two) pieces of left-eye image light including first and second pieces of left-eye image light and being used to display images for the left eye EB1 of stereo images in respective display planes of a plurality of (for example, two) display planes including the first and second display planes DS1 and DS2.

The first image-light generator 210 includes a plurality of (for example, two) first display elements 210a (210a-1 and 210a-2) respectively generating pieces of left-eye image light of the plurality of pieces of left-eye image light including the first and second pieces of left-eye image light.

Each first display element 210a includes, for example, a pixel array that includes a plurality of two-dimensionally arranged pixels. Each pixel includes a light emitter such as a surface-emitting laser, an organic EL element, or a light-emitting diode.

The first display element 210a-1 is arranged in front of the left eye EB1 of a watcher (also referred to as a "viewer"). In the pixel array included in the first display element 210a-1, a portion between pixels and/or a portion between images is transparent. This enables the watcher to view, through the first display element 210a, the first and second display planes DS1 and DS2 corresponding to virtual-image planes.

The first display element 210a-2 is arranged at a position that is not in front of the left eye EB1.

(First Optical System)

The first optical system 230 guides, to the left eye EB1 of the viewer, the plurality of pieces of left-eye image light coming from the first image-light generator 210.

The first optical system 230 includes a first beam splitter 230a and a condenser 230b, the first beam splitter 230a guiding, to the left eye EB1 of the viewer, portions of the respective pieces of left-eye image light of the plurality of pieces of left-eye image light coming from the plurality of (for example, two) first display elements 210a, the condenser 230b concentrating, onto the left eye EB1, the plurality of pieces of left-eye image light passing through the first beam splitter 230a. An optical-axis direction of the condenser 230b is substantially parallel to the direction of being situated close to and away from the two eyes.

The first beam splitter 230a is a non-polarization beam splitter (for example, a half mirror). A portion of the first left-eye image light coming from the first display element 210a-1 is transmitted through the first beam splitter 230a to be headed for the left eye EB1, and another portion of the first left-eye image light is reflected off the first beam splitter 230a.

A portion of the second left-eye image light coming from the second display element 210a-2 is reflected off the first beam splitter 230a to be headed for the left eye EB1, and another portion of the second left-eye image light is transmitted through the first beam splitter 230a.

The condenser 230b concentrates, onto the left eye EB1 of the watcher, the first left-eye image light transmitted through the first beam splitter 230a and the second left-eye image light reflected off the first beam splitter 230a.

(Second Image-Light Generator)

On the basis of the original image after correction that is received from the image correction section 103, the second image-light generator 220 generates a plurality of pieces of right-eye image light including first and second pieces of right-eye image light and being used to display images for the right eye EBr of the stereo images in the respective display planes of the plurality of (for example, two) display planes including the first and second display planes DS1 and DS2.

The second image-light generator 220 includes a plurality of (for example, two) first display elements 220a (220a-1 and 220a-2) respectively generating pieces of right-eye image light of the plurality of pieces of right-eye image light including the first and second pieces of right-eye image light.

Each first display element 220a includes, for example, a pixel array that includes a plurality of two-dimensionally arranged pixels. Each pixel includes a light emitter such as a surface-emitting laser, an organic EL element, or a light-emitting diode.

The first display element 220*a*-1 is arranged in front of the right eye EBr of the watcher (also referred to as the "viewer"). In the pixel array included in the first display element 220*a*-1, a portion between pixels or a portion between images is transparent. This enables the watcher to view, through the first display element 220*a*, the first and second display planes DS1 and DS2 corresponding to virtual-image planes.

The first display element 220*a*-2 is arranged at a position that is not in front of the right eye EBr.

(Second Optical System)

The second optical system 240 guides, to the right eye EBr of the viewer, the plurality of pieces of right-eye image light coming from the first image-light generator 210.

The second optical system 240 includes a second beam splitter 240*a* and a condenser 240*b*, the second beam splitter 240*a* guiding, to the right eye EBr of the viewer, portions of the respective pieces of right-eye image light of the plurality of pieces of right-eye image light coming from the plurality of (for example, two) first display elements 220*a*, the condenser 240*b* concentrating, onto the right eye EBr, the plurality of pieces of right-eye image light passing through the second beam splitter 240*a*.

The second beam splitter 240*a* is a non-polarization beam splitter (for example, a half mirror). A portion of the first right-eye image light coming from the first display element 220*a*-1 is transmitted through the second beam splitter 240*a* to be headed for the right eye EBr, and another portion of the first right-eye image light is reflected off the second beam splitter 240*a*.

A portion of the second right-eye image light coming from the second display element 220*a*-2 is reflected off the second beam splitter 240*a* to be headed for the right eye EBr, and another portion of the second right-eye image light is transmitted through the second beam splitter 240*a*.

The condenser 240*b* concentrates, onto the right eye EBr of the watcher, the first right-eye image light transmitted through the second beam splitter 240*a* and the second right-eye image light reflected off the second beam splitter 240*a*. An optical-axis direction of the condenser 240*b* is substantially parallel to the direction of being situated close to and away from the two eyes.

The first and second optical systems 230 and 240 have the same magnification.

A layout of the first display element 210*a*-1 and the first optical system 230 and a layout of the second display element 220*a*-1 and the second optical system 240 are optically substantially identical layouts (referred to as layouts 1).

In this case, a position of the first display plane DS1 is set using the layout 1 and a magnification of the first optical system 230.

A layout of the first display element 210*a*-2 and the first optical system 230 and a layout of the second display element 220*a*-2 and the second optical system 240 are optically substantially identical layouts (referred to as layouts 2).

In this case, a position of the second display plane DS2 is set using the layout 2 and a magnification of the second optical system 240.

Note that the position of the first display plane DS1 may be set using the layout 2 and the magnification of the second optical system 240, and the position of the second display plane DS2 may be set using the layout 1 and the magnification of the first optical system 230.

An operation (an action) of the display apparatus 10 is described below.

The first display element 210*a*-1 and the second display element 220*a*-1 are driven in synchronization with each other.

When the first display element 210*a*-1 is driven, left-eye image light is emitted by the first display element 210*a*-1 to be incident on the first beam splitter 230*a*. A portion of the left-eye image light emitted by the first display element 210*a*-1 and incident on the first beam splitter 230*a* is transmitted through the first beam splitter 230*a*, and another of the left-eye image light is reflected off the first beam splitter 230*a*. The light transmitted through the first beam splitter 230*a* is concentrated onto the left eye EBl of a watcher using the condenser 230*b*. This results in displaying, in the first display plane DS1, a left-eye image of a first stereo image based on an original image after correction (a corrected image).

When the second display element 220*a*-1 is driven, right-eye image light is emitted by the second display element 220*a*-1 to be incident on the second beam splitter 240*a*. A portion of the right-eye image light emitted by the second display element 220*a*-1 and incident on the second beam splitter 240*a* is transmitted through the second beam splitter 240*a*, and another of the right-eye image light is reflected off the second beam splitter 240*a*. The light transmitted through the second beam splitter 240*a* is concentrated onto the right eye EBr of the watcher using the condenser 240*b*. This results in displaying, in the first display plane DS1, a right-eye image of the first stereo image based on the corrected image.

When the first left-eye image light is concentrated onto the left eye EBl of the watcher and the first right-eye image light is concentrated onto the right eye EBr of the watcher, this results in displaying, in the first display plane DS1, the first stereo image (a virtual image) based on the corrected image.

The first display element 210*a*-2 and the second display element 220*a*-2 are driven in synchronization with each other.

When the first display element 210*a*-2 is driven, left-eye image light is emitted by the first display element 210*a*-2 to be incident on the first beam splitter 230*a*. A portion of the left-eye image light emitted by the first display element 210*a*-2 and incident on the first beam splitter 230*a* is transmitted through the first beam splitter 230*a*, and another of the left-eye image light is reflected off the first beam splitter 230*a*. The light transmitted through the first beam splitter 230*a* is concentrated onto the left eye EBl of the watcher using the condenser 230*b*. This results in displaying, in the second display plane DS2, a left-eye image of a second stereo image based on the original image after correction (the corrected image).

When the second display element 220*a*-2 is driven, right-eye image light is emitted by the second display element 220*a*-2 to be incident on the second beam splitter 240*a*. A portion of the right-eye image light emitted by the second display element 220*a*-2 and incident on the second beam splitter 240*a* is transmitted through the second beam splitter 240*a*, and another of the right-eye image light is reflected off the second beam splitter 240*a*. The light reflected off the second beam splitter 240*a* is concentrated onto the right eye EBr of the watcher using the condenser 240*b*. This results in displaying, in the second display plane DS2, a right-eye image of the second stereo image based on the corrected image.

When the second left-eye image light is concentrated onto the left eye EBl of the watcher and the second right-eye image light is concentrated onto the right eye EBr of the watcher, this results in displaying, in the second display plane DS2, the second stereo image (a virtual image) based on the corrected image.

6. <Display Processing 1>

Display Processing 1 (an example of a display method performed using the display apparatus 10 is described below with reference to FIGS. 7 to 10.

Display Processing 1 is display processing based on the above-described application sequence according to the present technology.

In Step S1, which is a first step, an original image is input to the image input section 101 of the correction system 100.

Figure 10:
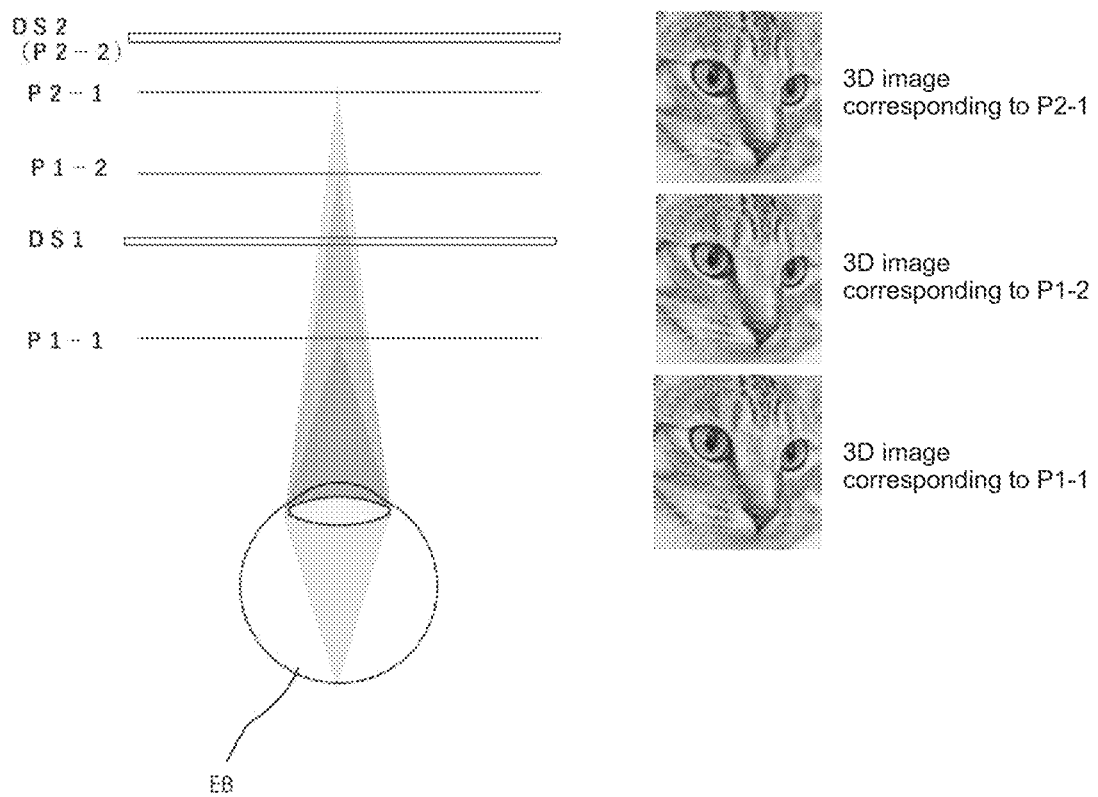
FIG. 10 is a diagram used to describe an action in Display Processing 1.

In Step S2, which is subsequent to Step S1, the correction system 100 generates a plurality of first corrected images respectively corresponding to first positions P1 of a plurality of first positions P1 (for example, a first position P1-1 and a first position P1-2, refer to FIG. 10), on the basis of pieces of first blur information regarding blurs respectively caused at the first positions P1 of the plurality of first positions P1 when the first display plane DS1 is used as a reference.

Specifically, first, the section 102 for acquiring/holding blur information acquires first blur information that is blur information regarding a blur caused at each of the plurality of first positions P1 when the first display plane DS1 is used as a reference, the plurality of first positions P1 being relatively close to the first display plane DS1 in the direction of being situated close to and away from the two eyes.

Here, the first position P1 is any position in a first viewing range that is a specified range that includes the first display plane DS1 in the direction of being situated close to and away from the two eyes (refer to FIG. 7). The first viewing range is a viewing range (a range in which a 3D image can be viewed) that is relatively close to the two eyes.

Next, the image correction section 103 corrects the original image on the basis of the pieces of first blur information regarding blurs caused at the respective first positions P1 to generate first corrected images.

A viewing range obtained by combining the first and second viewing ranges (refer to FIG. 7) is in a range of, for example, from 0.3 m to 2.0 m from the two eyes.

In Step S3, which is subsequent to Step S2, the correction system 100 generates a plurality of second corrected images respectively corresponding to second positions P2 of a plurality of second positions P2 (for example, a second position P2-1 and a second position P2-2 (DS2), refer to FIG. 10), on the basis of pieces of second blur information regarding blurs respectively caused at the second positions P2 of the plurality of second positions P2 when the second display plane DS2 is used as a reference.

Specifically, the section 102 for acquiring/holding blur information acquires first blur information that is blur information regarding a blur caused at each of the plurality of second positions P2 when the second display plane DS2 is used as a reference, the plurality of second positions P2 being relatively close to the second display plane DS2 in the direction of being situated close to and away from the two eyes.

The second position P2 is any position in a second viewing range that is a specified range that includes the second display plane DS2 in the direction of being situated close to and away from the two eyes (refer to FIG. 7). The second viewing range is a viewing range (a range in which a 3D image can be viewed) that is relatively away from the two eyes.

Next, the image correction section 103 corrects the original image on the basis of the pieces of second blur information regarding blurs caused at the respective second positions P2 to generate second corrected images.

In Step S4, which is subsequent to Step S3, the display system 200 chronologically displays, in the first display plane DS1, a plurality of first stereo images based respectively on the first corrected images of the plurality of first corrected images.

Specifically, the display system 200 consecutively displays first stereo images of the plurality of first stereo images in a range of a temporal resolution of eyes of a watcher. At this point, the watcher views a three-dimensional image in the form of an integration image obtained by integrating images based respectively on the consecutively displayed first stereo images of the plurality of first stereo images.

For example, as illustrated in FIG. 10, the watcher views, at the first position P1-1, a 3D image based on the first stereo image corresponding to the first position P1-1, and views, at the first position P1-2, a 3D image based on the first stereo image corresponding to the first position P1-2.

In Step S5, which is a last step, the display system 200 chronologically displays, in the second display plane DS2, a plurality of second stereo images based respectively on the second corrected images of the plurality of second corrected images. Specifically, the display system 200 consecutively displays second stereo images of the plurality of second stereo images in the range of the temporal resolution of the eyes of the watcher. At this point, the watcher views a 3D image in the form of an integration image obtained by integrating images based respectively on the consecutively displayed first stereo images of the plurality of first stereo images.

For example, as illustrated in FIG. 10, the watcher views, at the second position P2-1, a 3D image based on the second stereo image corresponding to the second position P2-1, and views, at the second position P2-2 (the second display plane DS2), a 3D image based on the second stereo image corresponding to the second position P2-2.

Note that it is favorable that a difference in time between a timing at which the last first stereo image is displayed in Step S4, and a timing at which the first second stereo image is displayed in Step S5 also be in the range of the temporal resolution of the eyes of the watcher.

Note that Step S3 described above may be performed before Step S2 described above. Step S5 described above may be performed before Step S4 described above.

7. <Effects Provided by Display Apparatus and Display Method According to Embodiment of Present Technology>

The display apparatus 10 according to the embodiment of the present technology is a display apparatus that displays, in at least one display plane, a stereo image based on an original image to cause a three-dimensional image to be viewed, the display apparatus 10 including the correction system 100 correcting the original image such that a blur caused when the three-dimensional image is caused to be viewed at at least one position P is suppressed, and the display system 200 displaying, in the display plane DS, the stereo image based on the original image after the correction.

This makes it possible to suppress a blur in a three-dimensional image viewed at at least one position P, while suppressing an increase in the number of display planes DS.

Consequently, the adoption of the display apparatus 10 makes it possible to provide a display apparatus that makes it possible to reduce vergence-accommodation conflict while preventing the apparatus from being made larger in size.

It is favorable that the at least one position include a position different from the display plane DS. The reason is that a blur amount in a three-dimensional image viewed at a position different from the display plane DS is larger than (exhibits a higher degree of VAC than) a blur amount in a three-dimensional image viewed in the display plane DS.

It is favorable that an original image after correction be more precise than the original image before the correction. The reason is that a blur equal to a blur in a three-dimensional image based on the original image is superimposed on a three-dimensional image based on the original image after correction.

The correction system 100 may correct the original image such that blurs caused when three-dimensional images are caused to be respectively viewed at the positions P of the plurality of positions P are suppressed, and may generate a plurality of corrected images respectively corresponding to the positions P of the plurality of positions P. The display system 100 may chronologically display, in the display plane DS, stereo images based respectively on corrected images of the plurality of corrected images. In this case, a watcher can view, at each of the plurality of positions P, a three-dimensional image in which a blur is suppressed. This makes it possible to reduce vergence-accommodation conflict at each position P.

The correction system 100 generates the plurality of corrected images such that a corrected image, from among the plurality of corrected images, that corresponds to the position P situated farther away from the display plane DS, is more precise. This makes it possible to effectively suppress a blur in a three-dimensional image viewed at the position P, independently of a distance between the display plane DS and the position P.

It is favorable that the correction system 100 generate the plurality of corrected images such that three-dimensional images respectively viewed at the positions P of the plurality of positions P exhibit the same level of preciseness. This makes it possible to cause uniform three-dimensional images to be viewed at the respective positions P.

The correction system 100 includes the section 102 for acquiring/holding blur information and the image correction section 103, the section 102 for acquiring/holding blur information acquiring and/or holding blur information that is information regarding a blur caused at at least one position P, the image correction section 103 correcting an original image on the basis of the blur information.

Further, the at least one display plane is a plurality of display planes including the first and second display planes DS1 and DS2. The section 102 for acquiring/holding blur information acquires first blur information that is blur information regarding a blur caused at a certain position when the first display plane DS1 is used as a reference, the certain position being relatively close to the first display plane DS1 in the direction of being situated close to and away from the two eyes. The section 102 for acquiring/holding blur information acquires second blur information that is blur information regarding a blur caused at another position when the second display plane DS2 is used as a reference, the other position being relatively close to the second display plane DS2 in the direction of being situated close to and away from the two eyes. The image correction section 103 corrects the original image on the basis of the first blur information to generate a first corrected image, and corrects the original image on the basis of the second blur information to generate a second corrected image.

This makes it possible to divide, into a plurality of (for example, two) ranges (such as the first and second viewing ranges) including the display plane, a range in which a three-dimensional image is viewed, to acquire blur information in each region obtained by the division, and to generate a corrected image on the basis of the blur information. Conversely, a viewing range in which a corrected image is generated can be divided into a plurality of viewing ranges including the first viewing range based on the first display plane DS1, and the second viewing range based on the second display plane DS2. This makes it possible to accurately acquire blur information with a reduced amount of calculation, and to quickly generate a corrected image in which a blur can be suppressed more certainly.

The display system 200 displays, in the first display plane DS1, a stereo image based on the first corrected image, and displays, in the second display plane DS2, an image based on the second corrected image. This enables a watcher to view, in each viewing range, a three-dimensional image in which a blur is suppressed.

The display system 200 includes the first and second image-light generators 210 and 220. The first image-light generator 210 generates a plurality of pieces of left-eye image light including first and second pieces of left-eye image light and being used to display left-eye images of stereo images in respective display planes DS of a plurality of display planes DS including the first and second display planes DS1 and DS2. The second image-light generator 220 generates a plurality of pieces of right-eye image light including first and second pieces of right-eye image light and being used to display right-eye images of the stereo images in the respective display planes DS of the plurality of display planes DS including the first and second display planes DS1 and DS2. Further, the display system 200 includes the first and second optical systems 230 and 240. The first optical system 230 guides, to the left eye EB1 of a viewer, the plurality of pieces of left-eye image light coming from the first image-light generator 210, and the second optical system 240 guides, to the right eye of the viewer, the plurality of pieces of right-eye image light coming from the second image-light generator 220. This makes it possible to display stereo images in the first and second display planes DS1 and DS2, respectively.

The first image-light generator 210 includes a plurality of first display elements 210a respectively generating pieces of left-eye image light of a plurality of pieces of left-eye image light, and the second image-light generator 220 includes a plurality of second display elements 220a respectively generating pieces of right-eye image light of a plurality of pieces of right-eye image light. The first optical system 230 includes the first beam splitter 230a guiding, to the left eye EB1 of a viewer, portions of the respective pieces of left-eye image light of the plurality of pieces of left-eye image light coming from the plurality of first display elements 210a. The second optical system 240 includes the second beam splitter 240a guiding, to the right eye EBr of the viewer, portions of the respective pieces of right-eye image light of the plurality of pieces of right-eye image light coming from the plurality of second display elements 220a. Consequently, such a simple configuration in which a beam splitter is shared to be used in each optical system makes it possible to display stereo images in the first and second display planes DS1 and DS2, respectively.

At least the display system 200 from among the correction system 100 and the display system 200 is used by being worn on the head of a viewer. This results in being able to provide a head-mounted display that makes it possible to suppress eyestrain and a 3D sickness.

The display method according to the present technology is a display method that displays, in at least one display plane, a stereo image based on an original image to cause a three-dimensional image to be viewed, the display method including correcting the original image such that a blur caused when the three-dimensional image is caused to be viewed at at least one position is suppressed, and displaying, in the display plane, the stereo image based on the original image after the correction.

This makes it possible to suppress a blur in a three-dimensional image viewed at at least one position P, while suppressing an increase in the number of display planes DS.

Consequently, the adoption of the display method according to the present technology makes it possible to reduce vergence-accommodation conflict while preventing an apparatus from being made larger in size.

It is favorable that the at least one position include a position different from the display plane DS. The reason is that a blur amount in a three-dimensional image viewed at a position different from the display plane DS is larger than (exhibits a higher degree of vergence-accommodation conflict than) a blur amount in a three-dimensional image viewed in the display plane DS.

It is favorable that the correcting include performing correction such that an original image after correction is more precise than the original image before the correction. The reason is that a blur equal to a blur in a three-dimensional image based on the original image is superimposed on a three-dimensional image based on the original image after correction.

The correcting may include correcting the original image such that blurs caused when three-dimensional images are caused to be respectively viewed at positions of a plurality of positions each being different from the display plane DS, are suppressed, and generating a plurality of corrected images respectively corresponding to the positions of the plurality of positions. The displaying may include chronologically displaying, in the display plane DS, stereo images based respectively on corrected images of the plurality of corrected images. In this case, a watcher can view, at each of the plurality of positions P, a three-dimensional image in which a blur is suppressed. This makes it possible to reduce vergence-accommodation conflict at each position P.

It is favorable that the correcting include generating the plurality of corrected images such that a corrected image, from among the plurality of corrected images, that corresponds to the position situated farther away from the display plane, is more precise. This makes it possible to effectively suppress a blur in a three-dimensional image viewed at the position P, independently of a distance between the display plane DS and the position P.

It is favorable that the correcting include generating the plurality of corrected images such that three-dimensional images respectively viewed at positions of the plurality of positions exhibit the same level of preciseness. This makes it possible to cause uniform three-dimensional images to be viewed at the respective positions P.

The correcting includes acquiring and/or holding blur information that is information regarding a blur caused at at least one position P, and correcting an original image on the basis of the blur information.

Further, the at least one display plane is a plurality of display planes including the first and second display planes DS1 and DS2 being arranged in a direction of being situated close to and away from two eyes of a viewer who views a three-dimensional image.

The acquiring and/or holding blur information includes acquiring first blur information that is blur information regarding a blur caused at a certain position when the first display plane DS1 is used as a reference, the certain position being relatively close to the first display plane DS1 in the direction of being situated close to and away from the two eyes. The acquiring and/or holding blur information includes acquiring second blur information that is blur information regarding a blur caused at another position when the second display plane DS2 is used as a reference, the other position being relatively close to the second display plane DS2 in the direction of being situated close to and away from the two eyes. The correcting the original image on the basis of the blur information includes correcting the original image on the basis of the first blur information to generate a first corrected image, and correcting the original image on the basis of the second blur information to generate a second corrected image.

This makes it possible to divide, into a plurality of (for example, two) ranges (such as the first and second viewing ranges) including the display plane, a range in which a three-dimensional image is viewed, to acquire blur information in each region obtained by the division, and to generate a corrected image on the basis of the blur information. Conversely, a viewing range in which a corrected image is generated can be divided into a plurality of viewing ranges including the first viewing range based on the first display plane DS1, and the second viewing range based on the second display plane DS2. This makes it possible to accurately acquire blur information with a reduced amount of calculation, and to quickly generate a corrected image in which a blur can be suppressed more certainly.

The displaying includes displaying, in the first display plane DS1, a first stereo image based on the first corrected image, and displaying, in the second display plane DS2, a second stereo image based on the second corrected image. This enables a watcher to view, in each viewing range, a three-dimensional image in which a blur is suppressed.

8. <Display Processing 2>

Figure 11:
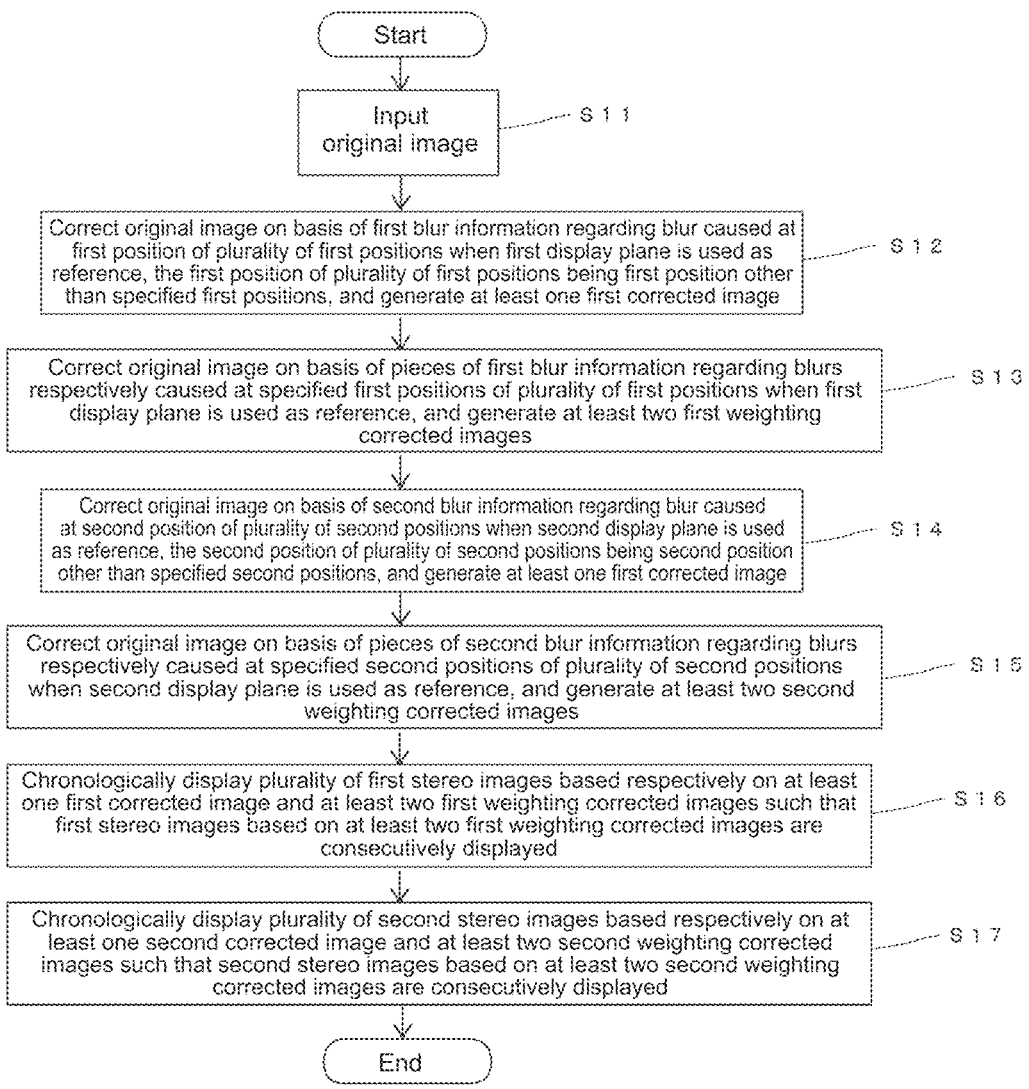
FIG. 11 is a flowchart used to describe Display Processing 2.

Display Processing 2 (an example of the display method according to the present technology) performed using the display apparatus 10 is described below with reference to a flowchart of FIGS. 11 and 12.

Display Processing 2 is display processing based on the above-described application sequence according to the present technology.

In Step S11, which is a first step, an original image is input to the image input section 101 of the correction system 100.

In Step S12, which is subsequent to Step S11, the correction system 100 corrects the original image on the basis of first blur information regarding a blur caused at a first position P1 of a plurality of first positions P1 when the first display plane DS1 is used as a reference, the first position P1 of the plurality of first positions P1 being a first position other than specified first positions, and generates at least one first corrected image. Specifically, the at least one first corrected image is generated as in Step S2 of FIG. 9.

In Step S13, which is subsequent to Step S12, the correction system 100 corrects the original image on the basis of pieces of first blur information regarding blurs respectively caused at the specified first positions of the plurality of first positions P1 when the first display plane DS1 is used as a reference, and generates at least two first weighting corrected images respectively corresponding to the specified first positions. Specifically, the at least two first weighting corrected images are generated as in Step S2 of FIG. 9.

In Step S14, which is subsequent to Step S13, the correction system 100 corrects the original image on the basis of second blur information regarding a blur caused at a second position P2 of a plurality of second positions P2 when the second display plane DS2 is used as a reference, the second position P2 of the plurality of second positions P2 being a second position other than specified second positions, and generates at least one second corrected image. Specifically, the at least second corrected image is generated as in Step S3 of FIG. 9.

In Step S15, which is subsequent to Step S14, the correction system 100 corrects the original image on the basis of pieces of second blur information regarding blurs respectively caused at the specified second positions of the plurality of second positions P2 when the second display plane DS2 is used as a reference, and generates at least two second weighting corrected images respectively corresponding to the specified second positions. Specifically, the at least two second weighting corrected images are generated as in Step S3 of FIG. 9.

In Step S16, which is subsequent to Step S15, the display system 200 chronologically displays, in the first display plane DS1, a plurality of first stereo images based respectively on the at least one first corrected image and the at least two first weighting corrected images such that the first stereo images based respectively on the at least two first weighting corrected images are consecutively displayed.

Specifically, the display system 200 consecutively displays first stereo images of the plurality of first stereo images in a range of a temporal resolution of eyes of a watcher. At this point, the watcher views a three-dimensional image in the form of an integration image obtained by integrating images based respectively on the consecutively displayed first stereo images of the plurality of first stereo images. When the first stereo images of the plurality of first stereo images are chronologically displayed, the first stereo images based respectively on the at least two first weighting corrected images are consecutively displayed.

Figure 12:
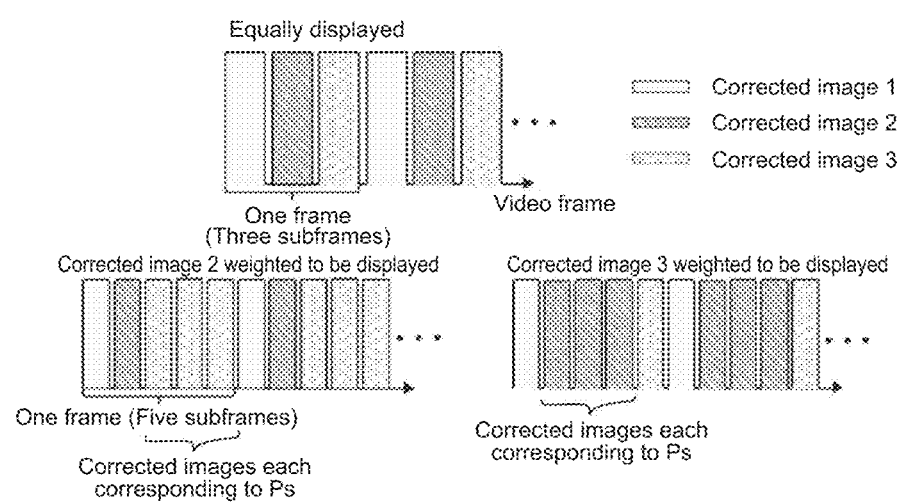
FIG. 12 is a diagram used to describe Display Processing 2.

FIG. 12 illustrates, in an upper portion, an example in which first stereo images based respectively on a plurality of first corrected images (for example, corrected images 1 to 3) are alternately equally displayed. Here, one frame is formed of three subframes that are, for example, the corrected image 1, the corrected image 2, and the corrected image 3.

FIG. 12 illustrates, on the left of a lower portion, an example in which first stereo images based respectively on corrected images 3 (first weighting corrected images) from among a plurality of first corrected images (for example, corrected images 1 and 2 and the corrected image 3) are weighted to be displayed (for example, the three first stereo images are consecutively displayed). Here, one frame is formed of five subframes that are, for example, the corrected image 1, the corrected image 2, and the three corrected images 3.

FIG. 12 illustrates, on the right of the lower portion, an example in which corrected images 2 (first weighting corrected images) from among a plurality of first corrected images (for example, a corrected image 1, the corrected image 2, and a corrected image 3) are weighted to be displayed (for example, the three corrected images 2 are consecutively displayed). Here, one frame is formed of five subframes that are, for example, the corrected image 1, the three corrected images 2 (first weighting corrected images), and the corrected image 3.

In Step S17, which is subsequent to Step S16, the display system 200 chronologically displays, in the second display plane DS2, a plurality of second stereo images based respectively on the at least one second corrected image and the at least two second weighting corrected images such that the second stereo images based respectively on the at least two second weighting corrected images are consecutively displayed.

Specifically, the display system 200 consecutively displays second stereo images of the plurality of second stereo images in the range of the temporal resolution of the eyes of the watcher. At this point, the watcher views a three-dimensional image in the form of an integration image obtained by integrating images based respectively on the consecutively displayed second stereo images of the plurality of second stereo images. When the second stereo images of the plurality of second stereo images are chronologically displayed, the second stereo images based respectively on the at least two second weighting corrected images are consecutively displayed (for example, refer to FIG. 12).

In Display Processing 2, the correction system 100 generates at least two corrected images respectively corresponding to specified positions from among a plurality of positions P at which a three-dimensional image is viewed, and the display system 200 consecutively displays, in the display plane DS, stereo images based respectively on the at least two corrected images respectively corresponding to the specified positions Ps. This makes it possible to provide a display apparatus that provides an improved effect of suppressing VAC caused in a three-dimensional image viewed at the specified position Ps.

In Display Processing 2, which is an example of the display method according to the present technology, the correcting includes generating at least two corrected images respectively corresponding to specified positions Ps from among a plurality of positions P, and the displaying includes consecutively displaying, in the display plane DS, stereo images based respectively on the at least two corrected images respectively corresponding to the specified positions Ps. This makes it possible to improve an effect of suppressing VAC caused in a three-dimensional image viewed at the specified position Ps.

It is favorable that a position (a depth position), such as a boundary of a plurality of different objects or a boundary of a plurality of different portions, for which the VAC suppressing effect is desired to be improved in particular be selected as the specified position Ps described above.

Note that Step S13 described above may be performed before Step S12 described above. Step S15 described above may be performed before Step S14 described above. A series of Steps S14 and S15 may be performed before a series of Steps S12 and S13.

9. <Display Processing 3>

Figure 13:
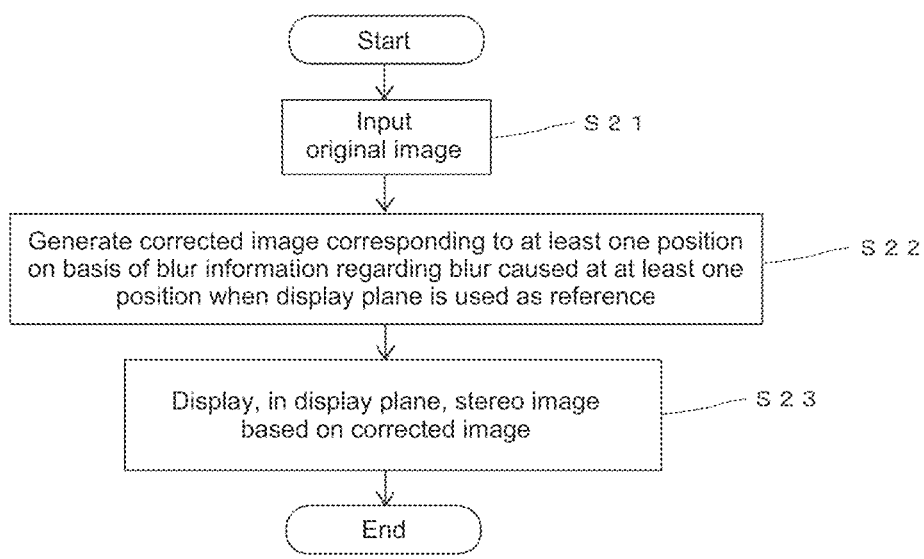
FIG. 13 is a flowchart used to describe Display Processing 3.

Display Processing 3 (an example of the display method according to the present technology) performed using the display apparatus 10 is described below with reference to a flowchart of FIG. 13.

Display Processing 3 is display processing based on the above-described basic sequence according to the present technology.

In Step S21, which is a first step, an original image is input to the image input section 101 of the correction system 100.

In Step S22, which is subsequent to Step S21, the correction system 100 generates a corrected image at at least one position P on the basis of blur information regarding a blur caused at the at least one position P when the display plane DS is used as a reference.

Specifically, first, the section 102 for acquiring/holding blur information acquires first blur information that is blur information regarding a blur caused at the at least one position P when the display plane DS is used as a reference.

Here, the position P is a viewing range that includes the display plane DS in the direction of being situated close to and away from the two eyes. The viewing range is a range of, for example, from 0.3 m to 2.0 m from the two eyes.

Next, the image correction section 103 corrects the original image on the basis of the blur information regarding a blur caused at the at least one position P to generate a corrected image.

In Step S23, which is a last step, the display system 200 displays, in the display plane DS, a stereo image based on at least one corrected image.

The display apparatus 10 used to perform Display Processing 3 provides effects substantially similar to the effects provided by the display apparatus 10 used to perform Display Processing 1.

Display Processing 3, which is an example of the display method according to the present technology, provides effects similar to the effects provided by Display Processing 1.
10. <Modifications of Present Technology>

The display apparatus and the display method of the embodiments of the present technology described above may be modified as appropriate.

For example, instead of the configuration of the display system 200 of the display apparatus 10 of the embodiment, the display system of the display apparatus according to the present technology may have a configuration of one of Modifications 1 to 4 indicated below.
(Modification 1)

For example, the beam splitter in each of the first and second optical systems of the display system may be replaced with a beam splitter of a polarization-type (a polarization beam splitter).

Specifically, for example, the polarization beam splitter may cause polarization directions of pieces of image light from respective display elements to be orthogonal to each other, one (p-polarized light) of two pieces of linearly polarized light of which the polarization directions are orthogonal to each other may be transmitted through the polarization beam splitter, and another (s-polarized light) of the two pieces of linearly polarized light may be reflected off the polarization beam splitter.

In this case, the transmittance (an amount of p-polarized light) and the reflectance (an amount of s-polarized light) of pieces of image light from the display elements with respect to the polarization beam splitter can be controlled. This makes it possible to sufficiently ensure an amount of light, from among pieces of image light from the display elements, that is irradiated onto an eyeball.

This results in being able to sufficiently ensure the brightness of a 3D image provided by the display apparatus.
(Modification 2)

Figure 14:
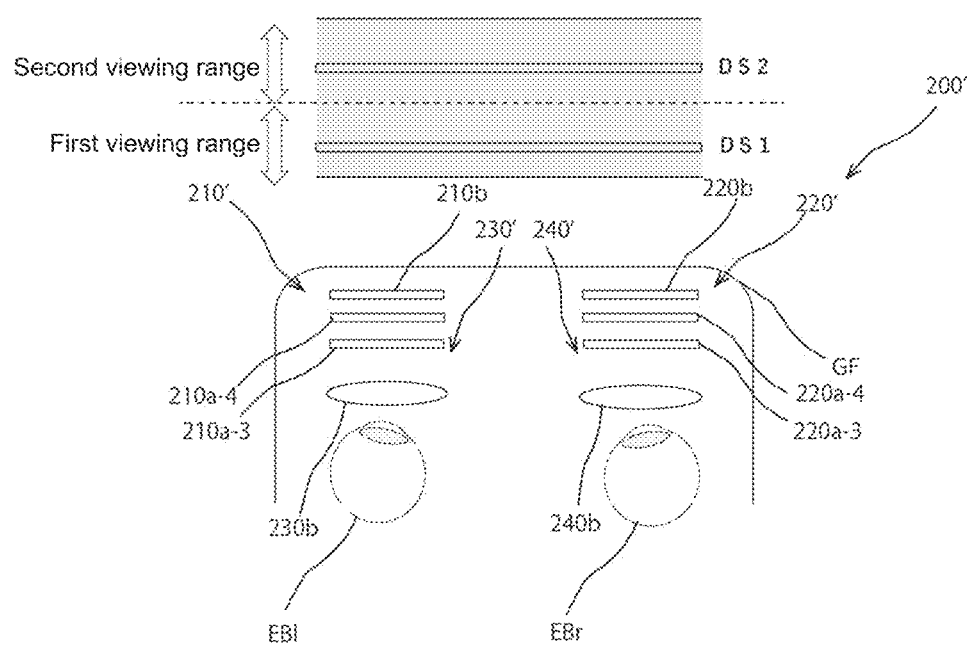
FIG. 14 illustrates a configuration of a display system of a display apparatus according to Modification 1 of the present technology.

For example, a first image-light generator 210' in a display system 200' of a display apparatus of Modification 2 includes a first light source 210b (for example, a backlight) and a plurality of (for example, two) first liquid crystal display elements 210a-3 and 210a-4 arranged between the first light source 210b and the left eye EB1 of a viewer, as illustrated in FIG. 14. The first liquid crystal display element 210a-4 is arranged at a position relatively close to the first light source 210b.

The condenser 230b is arranged between the first liquid crystal display element 210a-4 and the left eye EB1.

A second image-light generator 220' of the display system 200' includes a second light source 220b (for example, a backlight) and a plurality of second liquid crystal display elements 220a-3 and 220a-4 arranged between the second light source 220b and the right eye EBr of the viewer. The second liquid crystal display element 220a-4 is arranged at a position relatively close to the second light source 220b.

The condenser 240b is arranged between the second liquid crystal display element 220a-4 and the right eye EBr.

Light from the first light source 210b is irradiated onto the first liquid crystal display element 210a-3, and the first liquid crystal display element 210a-3 is driven on the basis of data of an original image after correction. This results in generating image light based on the original image after correction. The image light is concentrated onto the left eye EB1 using the condenser 230b. This results in displaying a left-eye image of a first stereo image in the first display plane DS1.

In synchronization with this operation, light from the second light source 220b is irradiated onto the second liquid crystal display element 220a-3, and the second liquid crystal display element 220a-3 is driven on the basis of the data of the original image after correction. This results in generating image light based on the original image after correction. The image light is concentrated onto the right eye EBr using the condenser 240b. This results in displaying a right-eye image of the first stereo image in the first display plane DS1.

Accordingly, the first stereo image is displayed in the first display plane DS1.

Light from the first light source 210b is irradiated onto the first liquid crystal display element 210a-4, and the first liquid crystal display element 210a-4 is driven on the basis of data of the original image after correction. This results in generating image light based on the original image after correction. The image light is concentrated onto the left eye EB1 using the condenser 230b. This results in displaying a left-eye image of a second stereo image in the second display plane DS2.

In synchronization with this operation, light from the second light source 220b is irradiated onto the second liquid crystal display element 220a-4, and the second liquid crystal display element 220a-4 is driven on the basis of the data of the original image after correction. This results in generating image light based on the original image after correction. The image light is concentrated onto the right eye EBr using the condenser 240b. This results in displaying a right-eye image of the second stereo image in the second display plane DS2.

Accordingly, the second stereo image is displayed in the second display plane DS2.

According to Modification 2, there is no need for an element, such as a beam splitter, that is used to cause image planes to overlap, since the liquid crystal display elements in each of the first and second image-light generators 210' and 220' are arranged to be parallel to each other in the optical-axis direction of the corresponding condenser. This makes it possible to make the display system 200' smaller in size.
(Modification 3)

When an image plane (a display plane) is moved at a speed higher than a temporal resolution of human eyes in the optical-axis direction of the condenser, this enables an overlap of image planes in time using afterimage effects.
(Modification 3-1)

Figure 15:
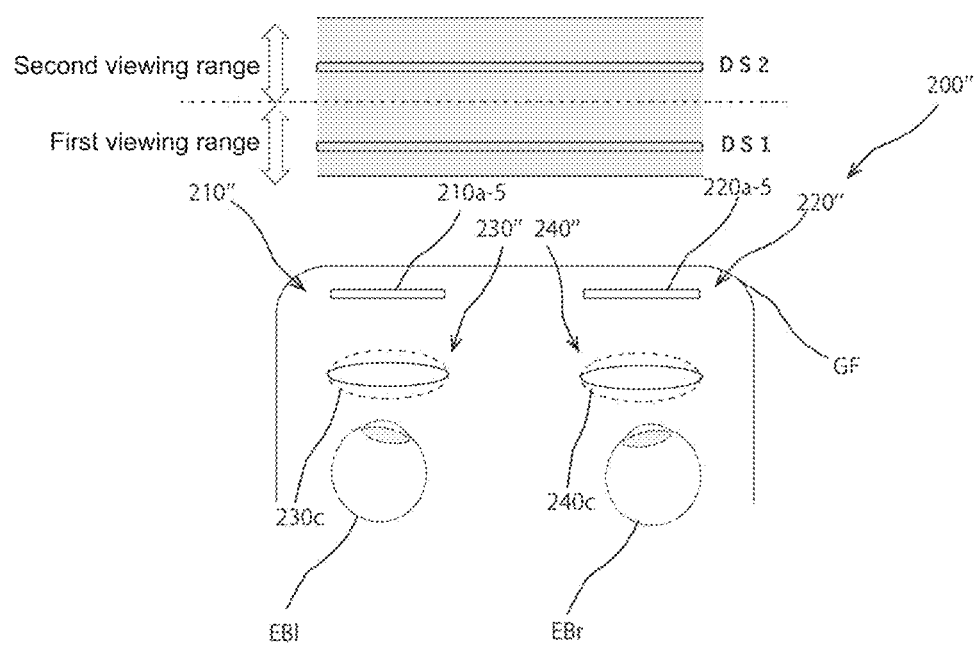
FIG. 15 illustrates a configuration of a display system of a display apparatus according to Modification 2 of the present technology.

For example, in a display system 200" of a display apparatus of Modification 3-1, a first optical system 230" includes a first focal-length changeable lens 230c between a first display element 210a-5 of a first image-light generator 210" and the left eye EB1, and a second optical system 230" includes a second focal-length changeable lens 230c between a second display element 220a-5 of a second image-light generator 220" and the right eye EBr, as illustrated in FIG. 15.

The focal length is changed using the respective focal-length changeable lenses, and this makes it possible to change a position at which an image is formed, and thus to change a position of an image plane (a display plane).

In this case, a timing at which an image plane occurs at a certain position, and a timing of generating a stereo image based on a corrected image generated on the basis of the image plane are synchronized with each other, and this makes it possible to obtain an effect of reducing vergence-accommodation conflict.

(Modification 3-2)

Figure 16:
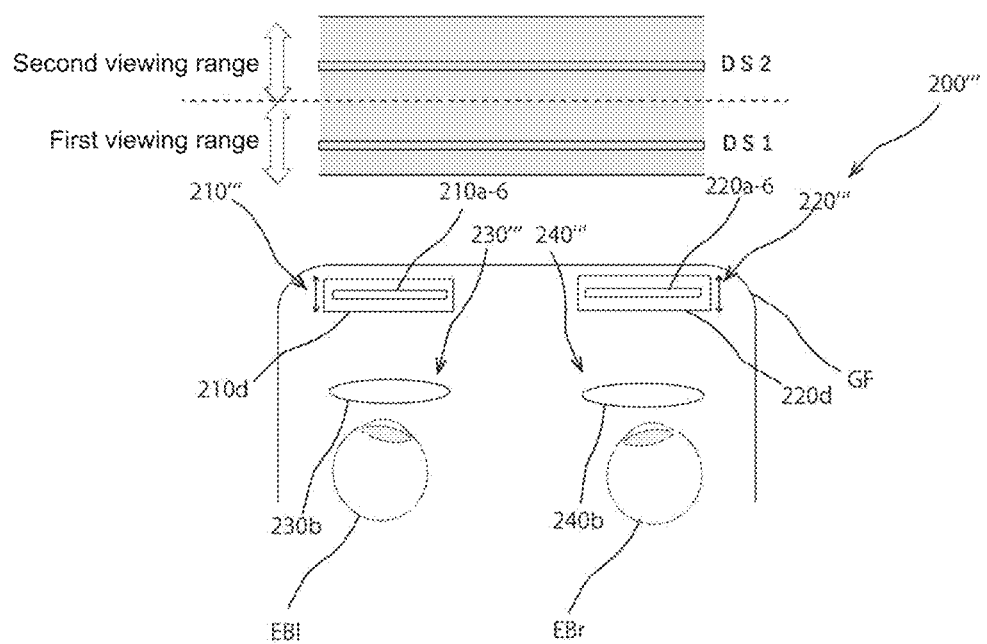
FIG. 16 illustrates a configuration of a display system of a display apparatus according to Modification 3 of the present technology.

For example, in a display system 200''' of a display apparatus of Modification 3-2, a first image-light generator 210''' includes a first movement stage 210d that serves as a first drive section that drives a first display element 210a-6 in the optical-axis direction of the corresponding condenser 230b, and a second image-light generator 210''' includes a second movement stage 220d that serves as a second drive section that drives a second display element 220a-6 in the optical-axis direction of the corresponding condenser 240b, as illustrated in FIG. 16.

The respective movement stages each including the display element are moved at a high speed in the optical-axis direction of the corresponding condenser, and this makes it possible to change a position at which an image is formed, and thus to change a position of an image plane (a display plane).

In this case, a timing at which an image plane occurs at a certain position, and a timing of displaying a stereo image based on a corrected image generated on the basis of the image plane are synchronized with each other, and this makes it possible to obtain an effect of reducing vergence-accommodation conflict.

Further, the present technology may also take the following configurations.

(1) A display apparatus that displays, in at least one display plane, a stereo image based on an original image to cause a three-dimensional image to be viewed, the display apparatus including:
   a correction system that corrects the original image such that a blur caused when the three-dimensional image is caused to be viewed at at least one position is suppressed; and
   a display system that displays, in the at least one display plane, a stereo image based on the original image after the correction.

(2) The display apparatus according to (1), in which the at least one position includes a position different from the display plane.

(3) The display apparatus according to (1) or (2), in which the original image after the correction is more precise than the original image before the correction.

(4) The display apparatus according to any one of (1) to (3), in which
   the correction system corrects the original image such that blurs caused when the three-dimensional images are caused to be respectively viewed at the positions of a plurality of the positions are suppressed, and generates a plurality of corrected images respectively corresponding to the positions of the plurality of the positions, and
   the display system chronologically displays, in the display plane, stereo images based respectively on corrected images of the plurality of corrected images.

(5) The display apparatus according to (4), in which
   the correction system generates the plurality of corrected images such that a corrected image, from among the plurality of corrected images, that corresponds to the position situated farther away from the display plane, is more precise.

(6) The display apparatus according to (4) or (5), in which
   the correction system generates the plurality of corrected images such that the three-dimensional images respectively viewed at the positions of the plurality of the positions exhibit the same level of preciseness.

(7) The display apparatus according to any one of (4) to (6), in which
   the correction system generates at least two corrected images, from among the plurality of corrected images, that respectively correspond to specified positions from among the plurality of the positions, and
   the display system consecutively displays, in the display plane, the stereo images based respectively on the at least two corrected images respectively corresponding to the specified positions.

(8) The display apparatus according to any one of (1) to (7), in which
   the correction system includes
      a section for acquiring/holding blur information that acquires and/or holds blur information that is information regarding the blur caused at the at least one position, and
      an image correction section that corrects the original image on the basis of the blur information.

(9) The display apparatus according to (8), in which
   the at least one display plane is a plurality of display planes including first and second display planes that are arranged in a direction of being situated close to and away from two eyes of a viewer who views the three-dimensional image,
   the section for acquiring/holding blur information acquires first blur information that is the blur information regarding a blur caused at a certain position when the first display plane is used as a reference, the certain position being relatively close to the first display plane in the direction of being situated close to and away from the two eyes,
   the section for acquiring/holding blur information acquires second blur information that is the blur information regarding a blur caused at another position when the second display plane is used as a reference, the other position being relatively close to the second display plane in the direction of being situated close to and away from the two eyes,
   the image correction section corrects the original image on the basis of the first blur information to generate a first corrected image,
   the image correction section corrects the original image on the basis of the second blur information to generate a second corrected image,
   the display system displays, in the first display plane, a stereo image based on the first corrected image, and
   the display system displays, in the second display plane, a stereo image based on the second corrected image.

(10) The display apparatus according to (9), in which the display system includes
a first image-light generator that generates a plurality of pieces of left-eye image light including first and second pieces of left-eye image light and being used to display left-eye images of the stereo images in respective display planes of the plurality of display planes including the first and second display planes,
a second image-light generator that generates a plurality of pieces of right-eye image light including first and second pieces of right-eye image light and being used to display right-eye images of the stereo images in the respective display planes of the plurality of display planes including the first and second display planes,
a first optical system that guides, to the left eye of the viewer, the plurality of pieces of left-eye image light coming from the first image-light generator, and
a second optical system that guides, to the right eye of the viewer, the plurality of pieces of right-eye image light coming from the second image-light generator.

(11) The display apparatus according to (10), in which
the first image-light generator includes a plurality of first display elements respectively generating pieces of left-eye image light of the plurality of pieces of left-eye image light,
the second image-light generator includes a plurality of second display elements respectively generating pieces of right-eye image light of the plurality of pieces of right-eye image light,
the first optical system includes a first beam splitter that guides, to the left eye of the viewer, portions of the respective pieces of left-eye image light of the plurality of pieces of left-eye image light coming from the plurality of first display elements, and
the second optical system includes a second beam splitter that guides, to the right eye of the viewer, portions of the respective pieces of right-eye image light of the plurality of pieces of right-eye image light coming from the plurality of second display elements.

(12) The display apparatus according to (10), in which
the first image-light generator includes
a first light source, and
a plurality of first liquid crystal display elements arranged between the first light source and the left eye of the viewer, and
the second image-light generator includes
a second light source, and
a plurality of second liquid crystal display elements arranged between the second light source and the right eye of the viewer.

(13) The display apparatus according to (10), in which
the first image-light generator includes a first display element,
the first optical system includes a first focal-length changeable lens that is arranged between the first display element and the left eye of the viewer,
the second image-light generator includes a second display element, and
the second optical system includes a second focal-length changeable lens that is arranged between the second display element and the right eye of the viewer.

(14) The display apparatus according to (10), in which
the first image-light generator includes
a first display element, and
a first drive section that drives the first display element in the direction of being situated close to and away from the two eyes, and the second image-light generator includes
a second display element, and
a second drive section that drives the second display element in the direction of being situated close to and away from the two eyes.

(15) The display apparatus according to any one of (1) to (14), in which
at least the display system from among the correction system and the display system is used by being worn on a head of the viewer.

(16) A display method that displays, in at least one display plane, a stereo image based on an original image to cause a three-dimensional image to be viewed, the display method including:
correcting the original image such that a blur caused when the three-dimensional image is caused to be
viewed at at least one position is suppressed; and
displaying, in the at least one display plane, the stereo image based on the original image after the correction.

(17) The display method according to (16), in which
the at least one position includes a position different from the display plane.

(18) The display method according to (16) or (17), in which
the correcting includes performing correction such that the original image after the correction is more precise than the original image before the correction.

(19) The display method according to any one of (16) to (18), in which
the correcting includes
correcting the original image such that blurs caused when the three-dimensional images are caused to be respectively viewed at the positions of a plurality of the positions are suppressed, and
generating a plurality of corrected images respectively corresponding to the positions of the plurality of the positions, and
the displaying includes chronologically displaying, in the display plane, stereo images based respectively on corrected images of the plurality of corrected images.

(20) The display method according to (19), in which
the correcting includes generating the plurality of corrected images such that a corrected image, from among the plurality of corrected images, that corresponds to the position situated farther away from the display plane, is more precise.

(21) The display method according to (19) or (20), in which
the correcting includes generating the plurality of corrected images such that the three-dimensional images respectively viewed at the positions of the plurality of the positions exhibit the same level of preciseness.

(22) The display method according to any one of (19) to (21), in which
the correcting includes generating at least two corrected images, from among the plurality of corrected images, that respectively correspond to specified positions from among the plurality of the positions, and
the displaying includes consecutively displaying, in the display plane, the stereo images based respectively on the at least two corrected images respectively corresponding to the specified positions.

(23) The display method according to any one of (16) to (21), in which
the correcting includes
acquiring and/or holding blur information that is information regarding the blur caused at the at least one position, and
correcting the original image on the basis of the blur information.

(24) The display method according to (23), in which
the at least one display plane is a plurality of display planes including first and second display planes that are arranged in a direction of being situated close to and away from two eyes of a viewer who views the three-dimensional image,
the acquiring and/or holding the blur information includes
acquiring first blur information that is the blur information regarding a blur caused at a certain position when the first display plane is used as a reference, the certain position being relatively close to the first display plane in the direction of being situated close to and away from the two eyes, and
acquiring second blur information that is the blur information regarding a blur caused at another position when the second display plane is used as a reference, the other position being relatively close to the second display plane in the direction of being situated close to and away from the two eyes,
the correcting the original image on the basis of the blur information includes
correcting the original image on the basis of the first blur information to generate a first corrected image, and
correcting the original image on the basis of the second blur information to generate a second corrected image, and
the displaying includes
displaying, in the first display plane, a stereo image based on the first corrected image, and
displaying, in the second display plane, a stereo image based on the second corrected image.

REFERENCE SIGNS LIST 10 display apparatus
100 correction system
102 section for acquiring/holding blur information
103 image correction section
200, 200', 200", 200'" display system
210, 210', 210", 210'" first image-light generator
210a-1, 210a-2, 210a-5, 210a-6 first display element
210a-3, 210a-4 first liquid crystal display element
210b first light source
210d first movement stage (first drive section)
220, 220', 220", 220'" second image-light generator
220a-1, 220a-2, 220a-5, 220a-6 second display element
220a-3, 220a-4 second liquid crystal display element
220b second light source
220d second movement stage (second drive section)
230, 230', 230", 230'" first optical system
230a first beam splitter
230c first focal-length changeable lens
240, 240', 240", 240'" second optical system
240a second beam splitter
240c second focal-length changeable lens
DS display plane
DS1 first display plane
DS2 second display plane
EB1 left eye
EBr right eye
P position

The invention claimed is:

1. A display apparatus comprising:
a central processing unit (CPU) configured to:
acquire an original image;
acquire a respective blur amount of each three-dimensional image of a first plurality of three-dimensional images,
wherein each three-dimensional image of the first plurality of three-dimensional images is viewable at a respective position of a first plurality of positions;
correct, based on the respective blur amount of each three-dimensional image of the first plurality of three-dimensional images, the original image to reduce the respective blur amount of each three-dimensional image of the first plurality of three-dimensional images; and
generate a first plurality of corrected images based on the correction of the original image,
wherein each corrected image of the first plurality of corrected images corresponds to the respective position of the first plurality of positions; and
a display system configured to chronologically display, in a first display plane of a plurality of display planes, a first plurality of stereo images based on the first plurality of corrected images,
wherein each three-dimensional image of the first plurality of three-dimensional images having the reduced respective blur amount is viewable at the respective position of the first plurality of positions based on the chronological display of the first plurality of stereo images.

2. The display apparatus according to claim 1, wherein the first plurality of positions is different from the first display plane.

3. The display apparatus according to claim 1, wherein the first plurality of corrected images is more precise than the original image.

4. The display apparatus according to claim 1, wherein
a first corrected image of the first plurality of corrected images is more precise than a second corrected image of the first plurality of corrected images, and
the respective position corresponding to the first corrected image is farther away from the first display plane than the respective position corresponding to the second corrected image.

5. The display apparatus according to claim 1, wherein the CPU is further configured to generate the first plurality of corrected images such that each three-dimensional image of the first plurality of three-dimensional images viewable at the respective position of the first plurality of positions exhibits a same level of preciseness.

6. The display apparatus according to claim 1, wherein the display system is further configured to consecutively display, in the first display plane, at least two stereo images of the first plurality of stereo images based on at least two corrected images of the first plurality of corrected images.

7. The display apparatus according to claim 1, further comprising a memory configured to hold blur information that indicates the respective blur amount of each three-dimensional image of the first plurality of three-dimensional images, and
the CPU is further configured to correct the original image based on the blur information.

8. The display apparatus according to claim 1, wherein
the plurality of display planes includes the first display plane and a second display plane that are arranged in a direction of being situated close to and away from two eyes of a viewer who views the first plurality of three-dimensional images,
the CPU is further configured to:
  acquire first blur information that indicates the respective blur amount of a first three-dimensional image of the first plurality of three-dimensional images, wherein
    the first three-dimensional image has the respective blur amount, in a case where the first three-dimensional image is viewed at a first position of the first plurality of positions and the first display plane is used as a reference, and
    the first position is closer to the first display plane in the direction of being situated close to and away from the two eyes than remaining positions of the first plurality of positions;
  acquire second blur information that indicates a blur amount of a third three-dimensional image, wherein
    the third three-dimensional image is different from the first plurality of three-dimensional images,
    the third three-dimensional image has the blur amount, in a case where the third three-dimensional image is viewed at a second position of a second plurality of positions and the second display plane is used as a reference, and
    the second position is closer to the second display plane in the direction of being situated close to and away from the two eyes than remaining positions of the second plurality of positions;
  correct the original image based on the first blur information to generate a first corrected image of the first plurality of corrected images; and
  correct the original image based on the second blur information to generate a second corrected image different from the first plurality of corrected images, and
the display system is further configured to:
  display, in the first display plane, a first stereo image of the first plurality of stereo images based on the first corrected image; and
  display, in the second display plane, a second stereo image different from the first plurality of stereo images based on the second corrected image.

9. The display apparatus according to claim 8, wherein the display system includes:
  a first image-light generator configured to generate a plurality of pieces of left-eye image light including a first piece of left-eye image light and a second piece of left-eye image light, wherein
    the first piece of left-eye image light and the second piece of left-eye image light are for display of a plurality of left-eye images in respective display planes of the plurality of display planes, and
    the first plurality of stereo images and the second stereo image include the plurality of left-eye images;
  a second image-light generator configured to generate a plurality of pieces of right-eye image light including a first piece of right-eye image light and a second piece of right-eye image light, wherein
    the first piece of right-eye image light and the second piece of right-eye image light are for display of a plurality of right-eye images in the respective display planes of the plurality of display planes, and
    the first plurality of stereo images and the second stereo image further include the plurality of right-eye images;
  a first optical system configured to guide, to a left eye of the two eyes of the viewer, the plurality of pieces of left-eye image light from the first image-light generator; and
  a second optical system configured to guide, to a right eye of the two eyes of the viewer, the plurality of pieces of right-eye image light from the second image-light generator.

10. The display apparatus according to claim 9, wherein
the first image-light generator includes a plurality of first display elements,
each display element of the plurality of first display elements is configured to generate a respective piece of left-eye image light of the plurality of pieces of left-eye image light,
the second image-light generator includes a plurality of second display elements,
each display element of the plurality of second display elements is configured to generate a respective piece of right-eye image light of the plurality of pieces of right-eye image light,
the first optical system includes a first beam splitter configured to guide, to the left eye of the viewer, a portion of the respective piece of left-eye image light of the plurality of pieces of left-eye image light from the plurality of first display elements, and
the second optical system includes a second beam splitter configured to guide, to the right eye of the viewer, a portion of the respective piece of right-eye image light of the plurality of pieces of right-eye image light coming from the plurality of second display elements.

11. The display apparatus according to claim 9, wherein
the first image-light generator includes:
  a first light source; and
  a plurality of first liquid crystal display elements between the first light source and the left eye of the viewer, and
the second image-light generator includes:
  a second light source; and
  a plurality of second liquid crystal display elements between
the second light source and the right eye of the viewer.

12. The display apparatus according to claim 9, wherein
the first image-light generator includes a first display element,
the first optical system includes a first focal-length changeable lens between the first display element and the left eye of the viewer,
the second image-light generator includes a second display element, and
the second optical system includes a second focal-length changeable lens between the second display element and the right eye of the viewer.

13. The display apparatus according to claim 9, wherein
the first image-light generator includes:
  a first display element; and
  a first drive section configured to drive the first display element in the direction of being situated close to and away from the two eyes, and the second image-light generator includes:
  a second display element, and
  a second drive section configured to drive the second display element in the direction of being situated close to and away from the two eyes.

14. The display apparatus according to claim 8, wherein the display system is wearable on a head of the viewer.

15. A display method, comprising:
  acquiring an original image;
  acquiring a respective blur amount of each three-dimensional image of a first plurality of three-dimensional images,
    wherein each three-dimensional image of the first plurality of three-dimensional images is viewable at a respective position of a first plurality of positions;
  correcting, based on the respective blur amount of each three-dimensional image of the first plurality of three-dimensional images, the original image to reduce the respective blur amount of each three-dimensional image of the first plurality of three-dimensional images;
  generating a first plurality of corrected images based on the correction of the original image,
    wherein each corrected image of the first plurality of corrected images corresponds to the respective position of the first plurality of positions; and
  chronologically displaying, in a first display plane of a plurality of display planes, a first plurality of stereo images based on the first plurality of corrected images.

16. The display method according to claim 15, wherein the first plurality of positions is different from the first display plane.

17. The display method according to claim 15, wherein the first plurality of corrected images is more precise than the original image.

18. The display method according to claim 15, wherein
  a first corrected image of the first plurality of corrected images is more precise than a second corrected image of the first plurality of corrected images, and
  the respective position corresponding to the first corrected image is farther away from the first display plane than the respective position corresponding to the second corrected image.

19. The display method according to claim 15, further comprising generating the first plurality of corrected images such that each three-dimensional image of the first plurality of three-dimensional images viewable at the respective position of the first plurality of positions exhibits a same level of preciseness.

20. The display method according to claim 15, further comprising consecutively displaying, in the first display plane, at least two stereo images of the first plurality of stereo images based on at least two corrected images of the first plurality of corrected images.

21. The display method according to claim 15, further comprising:
  holding blur information that indicates the respective blur amount of each three-dimensional image of the first plurality of three-dimensional images; and
  correcting the original image based on the blur information.

22. The display method according to claim 15, wherein
  the plurality of display planes includes the first display plane and a second display plane that are arranged in a direction of being situated close to and away from two eyes of a viewer who views the first plurality of three-dimensional images,
  the display method further includes:
    acquiring first blur information that indicates the respective blur amount of a first three-dimensional image of the first plurality of three-dimensional images, wherein
      the first three-dimensional image has the respective blur amount, in a case where the first three-dimensional image is viewed at a first position of the first plurality of positions and the first display plane is used as a reference, and
      the first position is closer to the first display plane in the direction of being situated close to and away from the two eyes than remaining positions of the first plurality of positions;
    acquiring second blur information that indicates a blur amount of a third three-dimensional image, wherein
      the third three-dimensional image is different from the first plurality of three-dimensional images,
      the third three-dimensional image has the blur amount, in a case where the third three-dimensional image is viewed at a second position of a second plurality of positions and the second display plane is used as a reference, and
      the second position is closer to the second display plane in the direction of being situated close to and away from the two eyes than remaining positions of the second plurality of positions;
    correcting the original image based on the first blur information to generate a first corrected image of the first plurality of corrected images;
    correcting the original image based on the second blur information to generate a second corrected image different from the first plurality of corrected images;
    displaying, in the first display plane, a first stereo image of the first plurality of stereo images based on the first corrected image; and
    displaying, in the second display plane, a second stereo image different from the first plurality of stereo images based on the second corrected image.

* * * * *